US 12,406,333 B2

United States Patent
Holland

(10) Patent No.: US 12,406,333 B2
(45) Date of Patent: Sep. 2, 2025

(54) APERTURE FUSION WITH SEPARATE DEVICES

(71) Applicant: QUALCOMM Incorporated, San Diego, CA (US)

(72) Inventor: Wesley James Holland, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 18/109,609

(22) Filed: Feb. 14, 2023

(65) Prior Publication Data

US 2024/0257309 A1 Aug. 1, 2024

Related U.S. Application Data

(60) Provisional application No. 63/482,513, filed on Jan. 31, 2023.

(51) Int. Cl.
*G06T 5/50* (2006.01)
*G06T 7/30* (2017.01)
(Continued)

(52) U.S. Cl.
CPC ................. *G06T 5/50* (2013.01); *G06T 7/30* (2017.01); *G06T 7/70* (2017.01); *H04N 5/2628* (2013.01);
(Continued)

(58) Field of Classification Search
CPC .... G06T 5/50; G06T 7/30; G06T 7/70; G06T 2207/20084; G06T 2207/20221;
(Continued)

(56) References Cited

U.S. PATENT DOCUMENTS

2011/0064327 A1\* 3/2011 Dagher ................. G06T 5/50
382/284
2014/0168261 A1 6/2014 Margolis et al.
(Continued)

FOREIGN PATENT DOCUMENTS

WO 2021193062 A1 9/2021

OTHER PUBLICATIONS

International Search Report and Written Opinion—PCT/US2024/012446—ISA/EPO—May 28, 2024.

*Primary Examiner* — Shahbaz Nazrul
(74) *Attorney, Agent, or Firm* — QUALCOMM Incorporated

(57) ABSTRACT

Systems and techniques for combining images captured by two or more image sensors are disclosed. For example, a method can include obtaining a first image of a scene from a first image sensor of a first device. The method can include obtaining a second image including at least a portion of the scene from a second image sensor of a second device. The second image is transmitted over a communications link. The method can include determining a localization between the first device and the second device based on a relative pose between the first device and the second device. The method can include normalizing one or more image properties between the first image and the second image. The method can include generating, based on the localization and normalizing the one or more image properties, a third image based on the first image and the second image.

30 Claims, 15 Drawing Sheets

(51) Int. Cl.
*G06T 7/70* (2017.01)
*H04N 5/262* (2006.01)
*H04N 5/265* (2006.01)
*H04N 7/18* (2006.01)

(52) U.S. Cl.
CPC ............ *H04N 5/265* (2013.01); *H04N 7/185* (2013.01); *G06T 2207/20084* (2013.01); *G06T 2207/20221* (2013.01); *G06T 2207/30244* (2013.01)

(58) Field of Classification Search
CPC ........ G06T 2207/30244; H04N 5/2628; H04N 5/265; H04N 7/185
See application file for complete search history.

(56) References Cited

U.S. PATENT DOCUMENTS

2017/0244811 A1 8/2017 McKenzie et al.
2022/0020168 A1* 1/2022 Price ....................... G06F 3/012

* cited by examiner

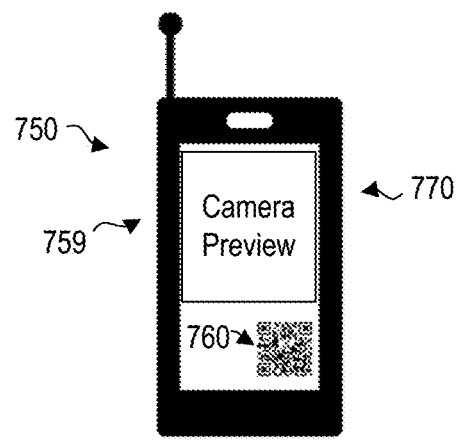
FIG. 7
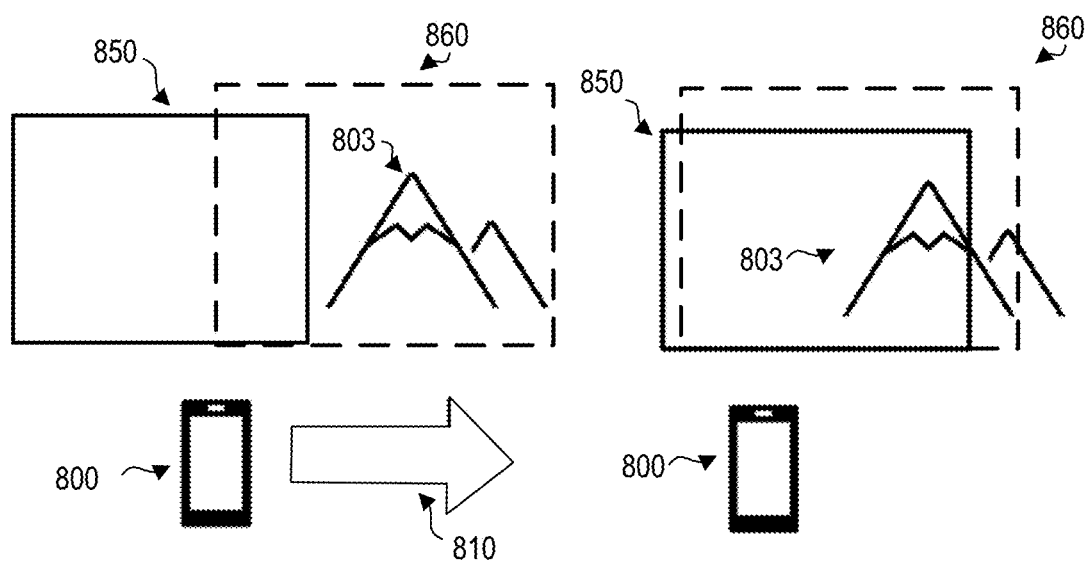
FIG. 8A  FIG. 8B

APERTURE FUSION WITH SEPARATE DEVICES

CROSS-REFERENCES TO RELATED APPLICATIONS

The present application claims priority to U.S. Provisional Application No. 63/482,513, filed Jan. 31, 2023, contents of which are hereby incorporated by reference as if set forth fully herein.

FIELD

This present disclosure is generally related to image processing. For example, aspects of the present disclosure relate to systems and techniques of fusing images captured by two or more cameras (e.g., in two or more different electronic devices).

BACKGROUND

Many devices and systems allow a scene to be captured by generating images (also referred to as frames or photographs) and/or video data (including multiple frames) of the scene. For example, a camera or a device including a camera can capture a single image or a sequence of frames (e.g., a video) of a scene. In some cases, the image or sequence of frames can be processed for performing one or more functions, can be output for display, can be output for processing and/or consumption by other devices, among other uses.

In some cases, multiple cameras can simultaneously capture images and/or video frames of a scene with different field of view, pose, depth of field, resolution, focus, or the like. In some cases, viewing images from the multiple cameras can provide a greater perspective of the scene. For example, images from a first camera may capture details of individual players in a sporting event, while images from a second camera may capture multiple players on a team spread across a playing field, the crowd, and/or other details not captured by the images from the first camera.

Extended reality (XR) devices are another example of devices that can include one or more cameras. XR devices can include augmented reality (AR) devices, virtual reality (VR) devices, mixed reality (MR) devices, or the like. For instance, examples of AR devices include smart glasses and head-mounted displays (HMDs). In general, an AR device can implement cameras and a variety of sensors to track the position of the AR device and other objects within the physical environment. An AR device can use the tracking information to provide a user of the AR device a realistic AR experience. For example, an AR device can allow a user to experience or interact with immersive virtual environments or content. To provide realistic AR experiences, AR technologies generally aim to integrate virtual content with the physical world. In some examples, AR technologies can match the relative pose and movement of objects and devices. For example, an AR device can use tracking information to calculate the relative pose of devices, objects, and/or maps of the real-world environment in order to match the relative position and movement of the devices, objects, and/or the real-world environment. Using the pose and movement of one or more devices, objects, and/or the real-world environment, the AR device can anchor content to the real-world environment in a convincing manner. The relative pose information can be used to match virtual content with the user's perceived motion and the spatio-temporal state of the devices, objects, and real-world environment.

SUMMARY

Systems and techniques are described herein for processing images. According to at least one example, a method is provided for processing images. The method includes: obtaining a first image of a scene from a first image sensor of a first device; obtaining a second image including at least a portion of the scene from a second image sensor of a second device, wherein the second image is transmitted over a communications link between the first device and the second device; determining a localization between the first device and the second device based on a relative pose between the first device and the second device; normalizing one or more image properties between the first image and the second image; and generating, basing on the localization between the first device and the second device and normalizing the one or more image properties between the first image and the second image, a third image based on the first image and the second image.

In another example, an apparatus for processing images is provided that includes at least one memory and at least one processor coupled to the at least one memory. The at least one processor is configured to: obtain a first image of a scene from a first image sensor of a first device; obtain a second image including at least a portion of the scene from a second image sensor of a second device, wherein the second image is transmitted over a communications link between the first device and the second device; determine a localization between the first device and the second device based on a relative pose between the first device and the second device; normalize one or more image properties between the first image and the second image; and generating, base on the localization between the first device and the second device and normalizing the one or more image properties between the first image and the second image, a third image based on the first image and the second image.

In another example, a non-transitory computer-readable medium is provided that has stored thereon instructions that, when executed by one or more processors, cause the one or more processors to: obtain a first image of a scene from a first image sensor of a first device; obtain a second image including at least a portion of the scene from a second image sensor of a second device, wherein the second image is transmitted over a communications link between the first device and the second device; determine a localization between the first device and the second device based on a relative pose between the first device and the second device; normalize one or more image properties between the first image and the second image; and generating, base on the localization between the first device and the second device and normalizing the one or more image properties between the first image and the second image, a third image based on the first image and the second image.

In another example, an apparatus for processing images is provided. The apparatus includes: means for obtaining a first image of a scene from a first image sensor of a first device; means for obtaining a second image including at least a portion of the scene from a second image sensor of a second device, wherein the second image is transmitted over a communications link between the first device and the second device; means for determining a localization between the first device and the second device based on a relative pose between the first device and the second device; means for normalizing one or more image properties between the first image and the second image; and generating, means for basing on the localization between the first device and the second device and normalizing the one or more image properties between the first image and the second image, a third image based on the first In some aspects, one or more of the apparatuses described herein is or is part of a camera, a mobile device (e.g., a mobile telephone or so-called "smart phone" or other mobile device), a wireless communication device, an extended reality device (e.g., a virtual reality (VR) device, an augmented reality (AR) device, or a mixed reality (MR) device), a wearable device, a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications (e.g., associated with processing of the image), and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 7 is a diagram illustrating an example user interface for an aperture fusion system, in accordance with some examples of the present disclosure;

FIGS. 8A and 8B are diagrams illustrating an example alignment indicator for an aperture fusion system including a head-mounted display (HMD) and a mobile device, in accordance with some examples of the present disclosure;

DETAILED DESCRIPTION

Figure 1:
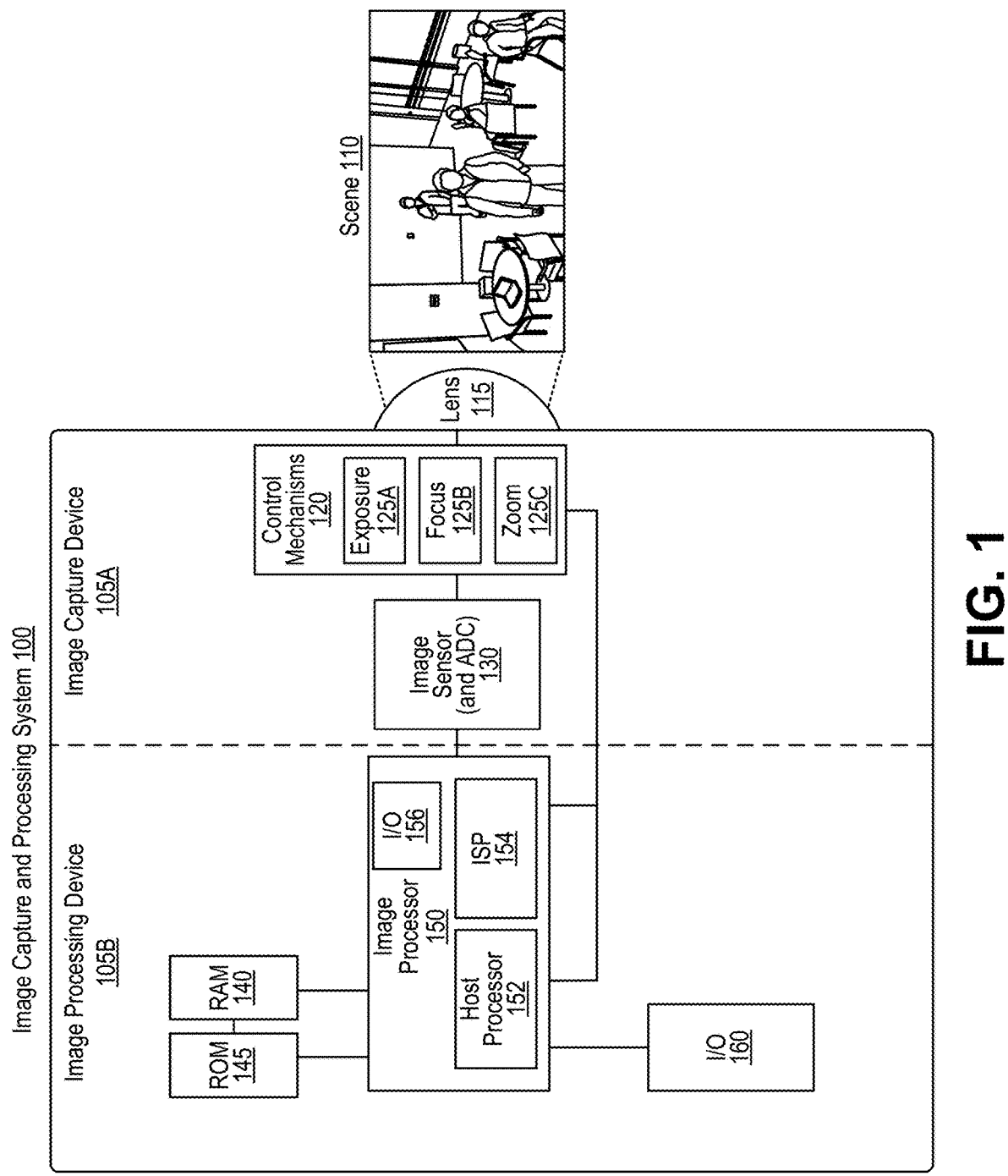
FIG. 1 is a block diagram illustrating an architecture of an image capture and processing device, in accordance with some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

An image capture device (e.g., a camera) is a device that receives light and captures image frames, such as still images or video frames (or sequences of still images or video frames), using an image sensor. The terms "image," "image frame," "video frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. In some cases, one or more control mechanisms can control exposure, focus, and/or zoom based on information from the image sensor and/or based on information from an image processor (e.g., a host or application process and/or an image signal processor). In some cases, the image or sequence of frames can be processed for performing one or more functions, can be output for display, can be output for processing and/or consumption by other devices, among other uses.

Degrees of freedom (DoF) refer to the number of basic ways a rigid object can move through three-dimensional (3D) space. In some cases, six different DoF can be tracked. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) devices are another example of devices that can include one or more cameras. XR devices can include augmented reality (AR) devices, virtual reality (VR) devices, mixed reality (MR) devices, or the like. For instance, examples of AR devices include smart glasses and head-mounted displays (HMDs). In general, an AR device can implement cameras and a variety of sensors to track the position of the AR device and other objects within the physical environment. An AR device can use the tracking information to provide a user of the AR device a realistic AR experience. For example, an AR device can allow a user to experience or interact with immersive virtual environments or content. To provide realistic AR experiences, AR technologies generally aim to integrate virtual content with the physical world. In some examples, AR technologies can match the relative pose and movement of objects and devices. For example, an AR device can use tracking information to calculate the relative pose of devices, objects, and/or maps of the real-world environment in order to match the relative position and movement of the devices, objects, and/or the real-world environment. Using the pose and movement of one or more devices, objects, and/or the real-world environment, the AR device can anchor content to the real-world environment in a convincing manner. The relative pose information can be used to match virtual content with the user's perceived motion and the spatiotemporal state of the devices, objects, and real-world environment.

XR systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. As used herein, the terms XR system and XR device are used interchangeably. Examples of XR systems or devices include head-mounted displays (HMDs), smart glasses, among others. In some cases, an XR system can track parts of the user (e.g., a hand and/or fingertips of a user) to allow the user to interact with items of virtual content.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In some implementations, the output of one or more sensors (e.g., an accelerometer, a gyroscope, one or more inertial measurement units (IMUs), and/or other sensors) can be used to determine a pose of a device (e.g., HMD, mobile device, or the like). An IMU is an electronic device that measures the specific force, angular rate, and/or the orientation of an electronic device, using a combination of one or more accelerometers, one or more gyroscopes, and/or one or more magnetometers. In some examples, the one or more sensors can output measured information associated with the capture of an image captured by a camera of the device (e.g., the HMD, the mobile device, or the like) and/or depth information obtained using one or more depth sensors of the device.

In the context of systems that track movement through an environment, such as XR systems and/or VSLAM systems, degrees of freedom can refer to which of the six degrees of freedom the system is capable of tracking. 3DoF systems generally track the three rotational DoF—pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

Systems that track movement through an environment, such as XR systems and/or VSLAM systems, generally include powerful processors. These powerful processors can be used to perform complex operations quickly enough to display an up-to-date output based on those operations to the users of these systems. Such complex operations can relate to feature tracking, 6DoF tracking, VSLAM, rendering virtual objects to overlay over the user's environment in XR, animating the virtual objects, and/or other operations discussed herein. Powerful processors typically draw power at a high rate. Sending large quantities of data to powerful processors typically draws power at a high rate, and such systems often capture large quantities of sensor data (e.g., images, location data, and/or other sensor data) per second. Headsets and other portable devices typically have small batteries so as not to be uncomfortably heavy to users. Thus, typical XR headsets either must be plugged into an external power source, are uncomfortably heavy due to inclusion of large batteries, or have very short battery lives.

In some cases, cameras included in separate devices may concurrently capture images of the same scene. As used herein, separate devices that may concurrently capture a scene can include, without limitation, a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device.

For example, a first camera included in a first device (e.g., ahead mounted XR device) may capture images of a scene (e.g., as part of a VSLAM operation) concurrently with a second camera included in a separate second device (e.g., a mobile device). In some examples, the first and second device may move relative to one another while capturing images of the scene. For example, a user may turn their head to focus on a particular object in a scene. As another example, a user may reposition the mobile device with 6DoF to maintain and/or adjust the position of an object or event of interest within the scene. In some cases, the different positions of the first and second camera can result in capturing different perspectives of a scene (e.g., depth of field, field of view (FOV), or the like). In addition, the first camera and the second camera may have different camera sensor characteristics (e.g., resolution, sensor design, sensor technology, or the like), different lens characteristics, and/or other differences that may affect the images of the scene. In some cases, the resulting images from different cameras can have different image properties, including, but not limited to resolution, brightness, white balance, color balance, focus, depth of field, FOV, distortion, and/or any other image properties. In some cases, it would be beneficial to combine images of a scene captured by the first camera and the second camera into a combined image that provide a unique perspective of the scene.

In some cases, it can be preferable for a combined image captured by two (or more) cameras (e.g., cameras in separate devices) to have the appearance of being captured by a single camera. For example, a combined image may have the appearance of being captured entirely from the position of a camera in the head mounted device (HMD). In another example, the combined image may have the appearance of being captured from the position of a mobile device (e.g., held in the hands of a user). In some examples, the combined image may have the appearance of being captured from a novel viewpoint that is different from the viewpoint of each of the separate devices contributing to the combined image.

In some cases, combining the images captured by two different cameras can include one or more steps for creating a combined image. In some cases, combining the images can include reconciling different perspectives of the camera systems. For example, the camera on the HMD can be positioned higher and farther away from the scene than the camera included in the mobile device (e.g., when the mobile device is being held in front of the wearer of the HMD below head height). In some cases, the two devices can move relative to one another. In some cases, the change in position can be dynamic. For example, the HMD, the mobile device, and/or both can change pose a user's head and/or hands move during capture of a scene. In some cases, the HMD and/or the mobile device can perform 6DoF tracking (e.g., using cameras, accelerometers, gyroscopes, IMUs, and/or any combination thereof). As used herein, viewpoint synthesis refers to a process of combining images originally captured from different perspectives to generate a combined image with the appearance of being captured from a single perspective. In some cases, the viewpoint synthesis can generate a combined image that appears to be captured from the original perspective of one of the original images. In some examples, viewpoint synthesis can generate a combined image that is different from the original perspective of any of the original images.

In some cases, the HMD and the mobile device can exchange (e.g., by wired or wireless communication) localization information. Localization information can include, without limitation, SLAM maps, sensor measurements (e.g., from LIDAR sensors, RADAR sensors, SODAR sensors, SONAR sensors. audio sensors, inertial sensor, and/or any other sensor), images, feature vectors, or the like). In some examples, the HMD, the mobile device, and/or both can determine relative pose information based on localization information from only one of the devices. In some examples, the HMD, the mobile device, and/or both can determine relative pose information based on a combination of localization information captured by both devices.

In one illustrative example, the HMD can determine a localization (e.g., a relative position, relative pose, or the like) between the HMD and the mobile device (e.g., determine relative position, relative pose information for the HMD and the mobile device) based on the images captured by the camera (and/or other sensors) of the HMD. In another illustrative example, the HMD can transmit images (and/or other sensor measurements) to the mobile device (e.g., by wired or wireless communication), and the mobile device can determine a localization between the HMD and the mobile device.

In some cases, the relative positioning (or relative pose) of the HMD and the mobile device may change dynamically during capture of sequences of images. In some cases, the viewpoint synthesis can include updating localization (e.g., relative pose) between the HMD and the mobile device and dynamically adapting to changes in the localization as part of viewpoint synthesis.

In some aspects, an image of the scene captured by the camera of the HMD can be obstructed by the mobile device, portions of a human body (e.g., arms, hands, or the like), a mechanical fixture (e.g., a tripod, a telescoping mounting structure, a gimbal system, or the like).

In some cases, generating a combined image can include identifying and/or removing obstructions (also referred to herein as occlusions) from one or both of the images. In some cases, identifying and/or removing obstructions can include at least one or more of segmentation, feature extraction, inpainting, alpha blending, or the like.

In some examples, generating a combined image can include image normalization (e.g., to account for differences in properties of the images captured by different cameras (e.g., resolution, brightness, white balance, color balance, focus, depth of field, FOV, distortion, and/or any other image properties). In some cases, generating the combined image can include additional image fusion techniques to generate a combined image.

As described in more detail herein, systems, apparatuses, methods (also referred to as processes, and computer-readable media (collectively referred to herein as "systems and techniques") are described herein for generating a combined image based on two or more input images captured by image sensors of separate devices (e.g., a camera included in an HMD and a camera included in a mobile device). In some cases, the systems and techniques can remove one or more obstructions (e.g., a mobile device, a user's hands, a mechanical fixture) from one or more of the input images. In some cases, the image capture devices providing the input images may be housed in separate housings. In some examples, the image captured devices may not be rigidly physically attached such that their relative positioning (or pose) varies between images captured at different times. For example, the relative positioning (or pose) can vary between snapshots captured at different times. In another illustrative example, the relative positioning (or pose) can change dynamically during an image capture sequence (e.g., capturing a video). In some examples, the systems and techniques can obtain localization information from one or more of the devices. In some cases, the systems and techniques can generate an image with a novel viewpoint from the input images and the localization images. In some cases, the novel viewpoint can correspond to the viewpoint of one of the input device. In one illustrative example, the systems and techniques can combine an image from an HMD with an image from a mobile device and generate an image from the viewpoint of the mobile device. In one illustrative example, the systems and techniques can combine an image from an HMD with an image from a mobile device and generate an image from the viewpoint of the HMD.

In some cases, the systems and techniques for generating a combined image based on two or more input images can use one or more machine learning (ML) systems.

ML is a subset of artificial intelligence (AI). ML systems include algorithms and statistical models that computer systems can use to perform various tasks by relying on patterns and inference, without the use of explicit instructions. One example of a ML system is a neural network (also referred to as an artificial neural network), which may be composed of an interconnected group of artificial neurons (e.g., neuron models). Neural networks may be used for various applications and/or devices, such as image analysis and/or computer vision applications, Internet Protocol (IP) cameras, Internet of Things (IoT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks exist, such as deep generative neural network models (e.g., generative adversarial network (GANs)), recurrent neural network (RNN) models, multilayer perceptron (MLP) neural network models, convolutional neural network (CNN) models, among others. A GAN is a form of generative neural network that can learn patterns in input data so that the neural network model can generate new synthetic outputs that reasonably could have been from the original dataset. A GAN can include two neural networks that operate together. One of the neural networks (referred to as a generative neural network or generator denoted as G(z)) generates a synthesized output, and the other neural network (referred to as an discriminative neural network or discriminator denoted as D(X)) evaluates the output for authenticity (whether the output is from an original dataset, such as the training dataset, or is generated by the generator). The training input and output can include images as an illustrative example. The generator is trained to try and fool the discriminator into determining a synthesized image generated by the generator is a real image from the dataset. The training process continues and the generator becomes better at generating the synthetic images that look like real images. The discriminator continues to find flaws in the synthesized images, and the generator figures out what the discriminator is looking at to determine the flaws in the images. Once the network is trained, the generator is able to produce realistic looking images that the discriminator is unable to distinguish from the real images.

RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. CNNs may include collections of artificial neurons that each have a receptive field (e.g., a spatially localized region of an input space) and that collectively tile an input space. CNNs have numerous applications, including pattern recognition and classification.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 13:
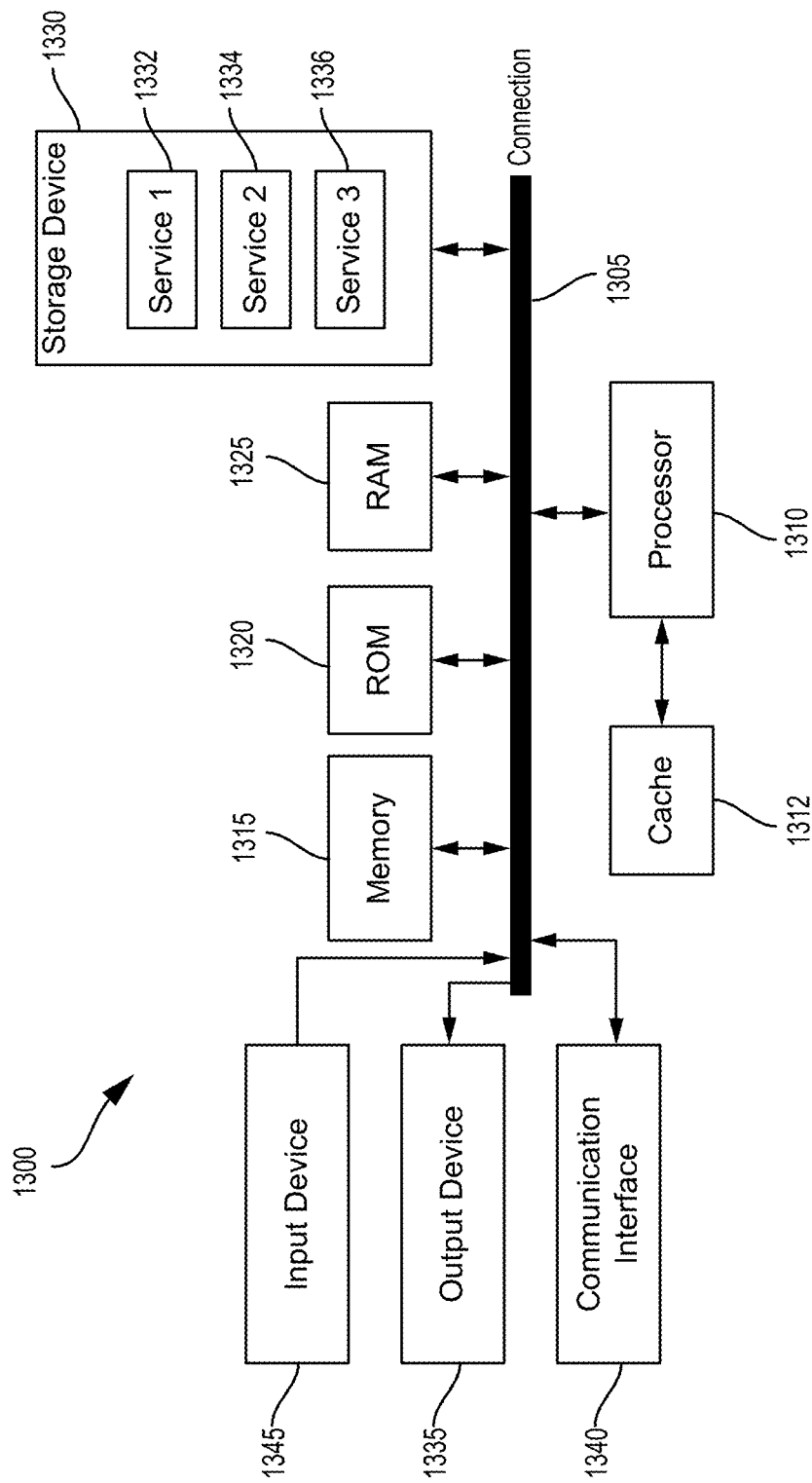
FIG. 13 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1310 discussed with respect to the computing system 1300 of FIG. 13. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1325, read-only memory (ROM) 145/1320, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1335, any other input devices 1345, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image processing device 105B, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1002.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more or fewer components than those shown in FIG. 1. In some cases, the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
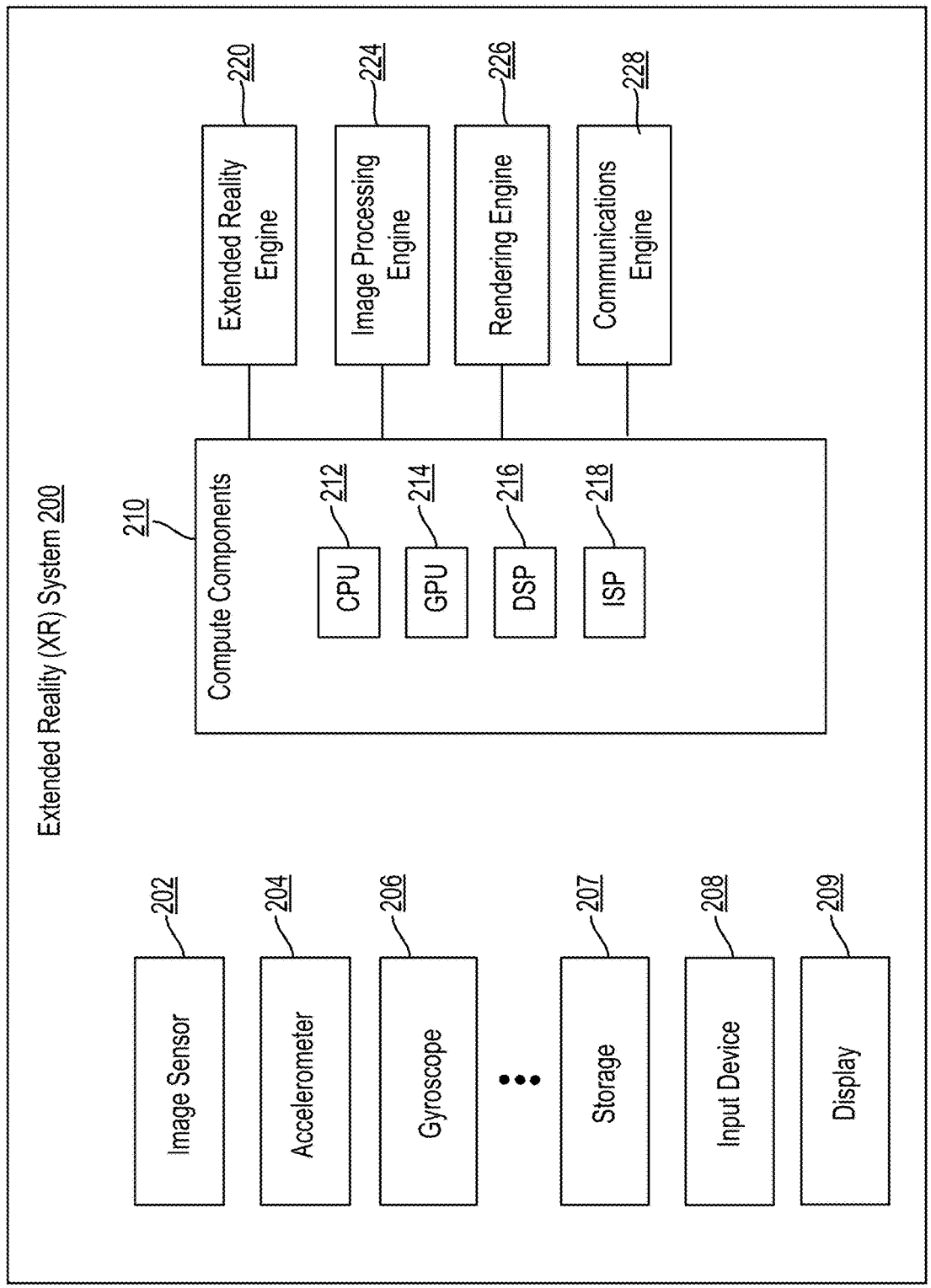
FIG. 2 is a block diagram illustrating an architecture of an example extended reality (XR) system, in accordance with some examples of the present disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, less, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1345 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1340 of FIG. 13.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210.

For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU.

An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
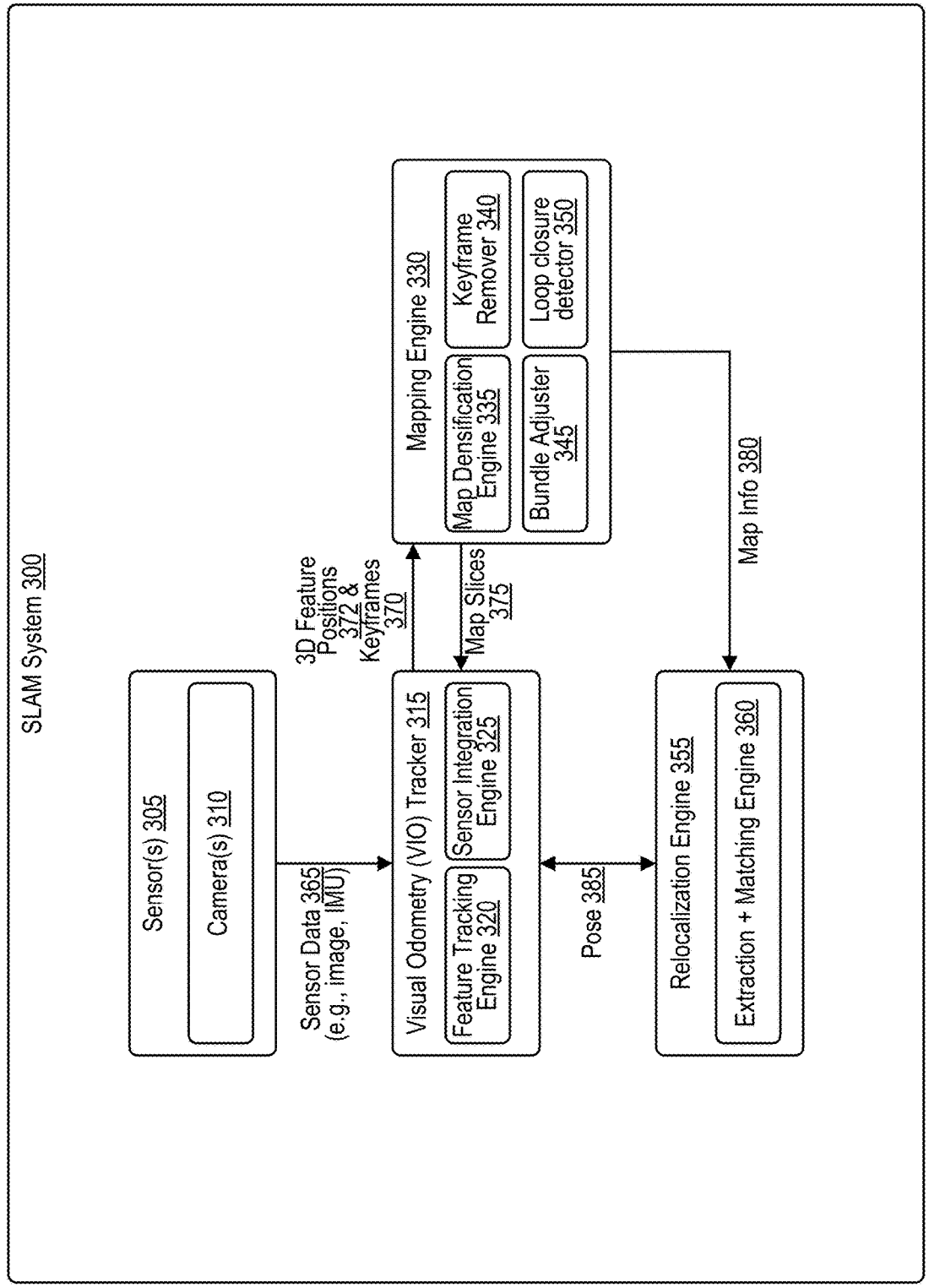
FIG. 3 is a block diagram illustrating an architecture of a simultaneous localization and mapping (SLAM) device, in accordance with some examples of the present disclosure.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS)

receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 372 of a particular feature. The 3D feature positions 372 can include one or more 3D feature positions and can also be referred to as 3D feature points. The 3D feature positions 372 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 372 of the particular feature when considered by the feature tracking engine 320 and/or the sensor integration engine 325 for determination of the 3D feature positions 372. In some examples, a keyframe corresponding to a particular feature also includes data about the pose 385 of the SLAM system 300 and/or the camera(s) 310 during capture of the keyframe. In some examples, the VIO tracker 315 can send 3D feature positions 372 and/or keyframes 370 corresponding to one or more features to the mapping engine 330. In some examples, the VIO tracker 315 can receive map slices 375 from the mapping engine 330. The VIO tracker 315 can extract feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 372 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 372. The map information 380 can include one or more keyframes 370 corresponding to certain features and certain 3D feature positions 372.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can extract features from an image captured by the cameras 310 of the SLAM system 300 while the SLAM system 300 is at a current pose 385, and can match the extracted features to features depicted in different keyframes 370, identified by 3D feature positions 372, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

Figure 4A:
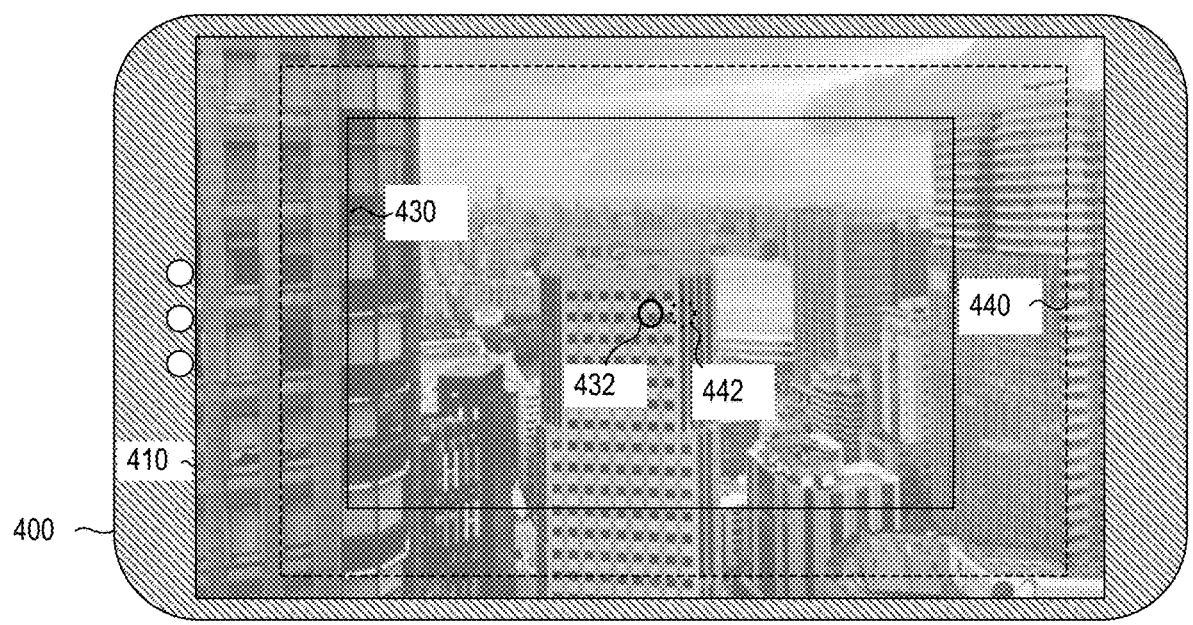
FIGS. 4A and 4B illustrate an example of spatial alignment and transformation (SAT) of an image, in accordance with some examples of the present disclosure.
Figure 4B:
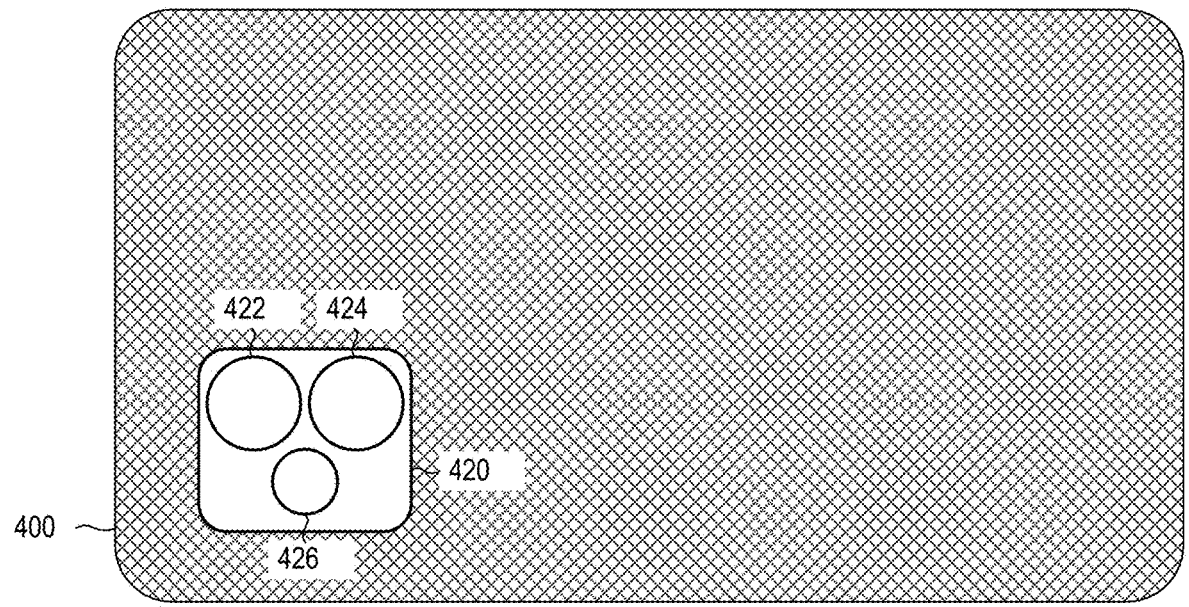

FIGS. 4A through 4E illustrate example spatial alignment and transformation (SAT) of images in accordance with some aspects. In particular, FIG. 4A illustrates a front side of a device 400 is configured to display an image from a display based on a scene 410. FIG. 4B illustrates a rear side of the device 400 and a lens array 420 having an ultra wide-angle lens 422, a wide-angle lens 424, and a telephoto lens 426. The ultra wide-angle lens 422, wide-angle lens 424, and telephoto lens 426 are all planar and point in parallel directions, but each has a different center point, and a different FOV.

Referring back to FIG. 4A, the ultra wide-angle lens 422 has a FOV 430 and with a center point 432. The wide-angle lens 424 has a larger FOV 440 that includes all of the FOV 430 of the ultra wide-angle lens 422 and has a center point 442 that is offset to the right of the center point 432 of the ultra wide-angle lens 422. When the rear surface of the device 400 is pointing the lens array 420 at the scene 410, the wide-angle lens 424 will be positioned to the left of the ultra wide-angle lens 422. The positioning of the center points is based on the orientation of the device 400 and may be offset to the left, right, top, or bottom.

In some aspects, the device 400 is configured to modify the image captured from the wide-angle lens 424 to correspond to the FOV 430. For example, the device 400 may crop the image from the wide-angle lens 424 to be substantially equal to the FOV 430 perceived by the ultra wide-angle lens 422. Other types of correction may be required to reduce effects associated with the different lens, such as correction of some distortion, or other processing needed to make the image from the wide-angle lens 424 substantially identical to the scene as perceived by the ultra wide-angle lens 422. In some cases, there could be various differences such as color balance, slight variation in image quality, and so forth, but these effects can be minimal as compared to freezing images, dropping images and displaying a black image, substantially darker images.

Figure 4C:
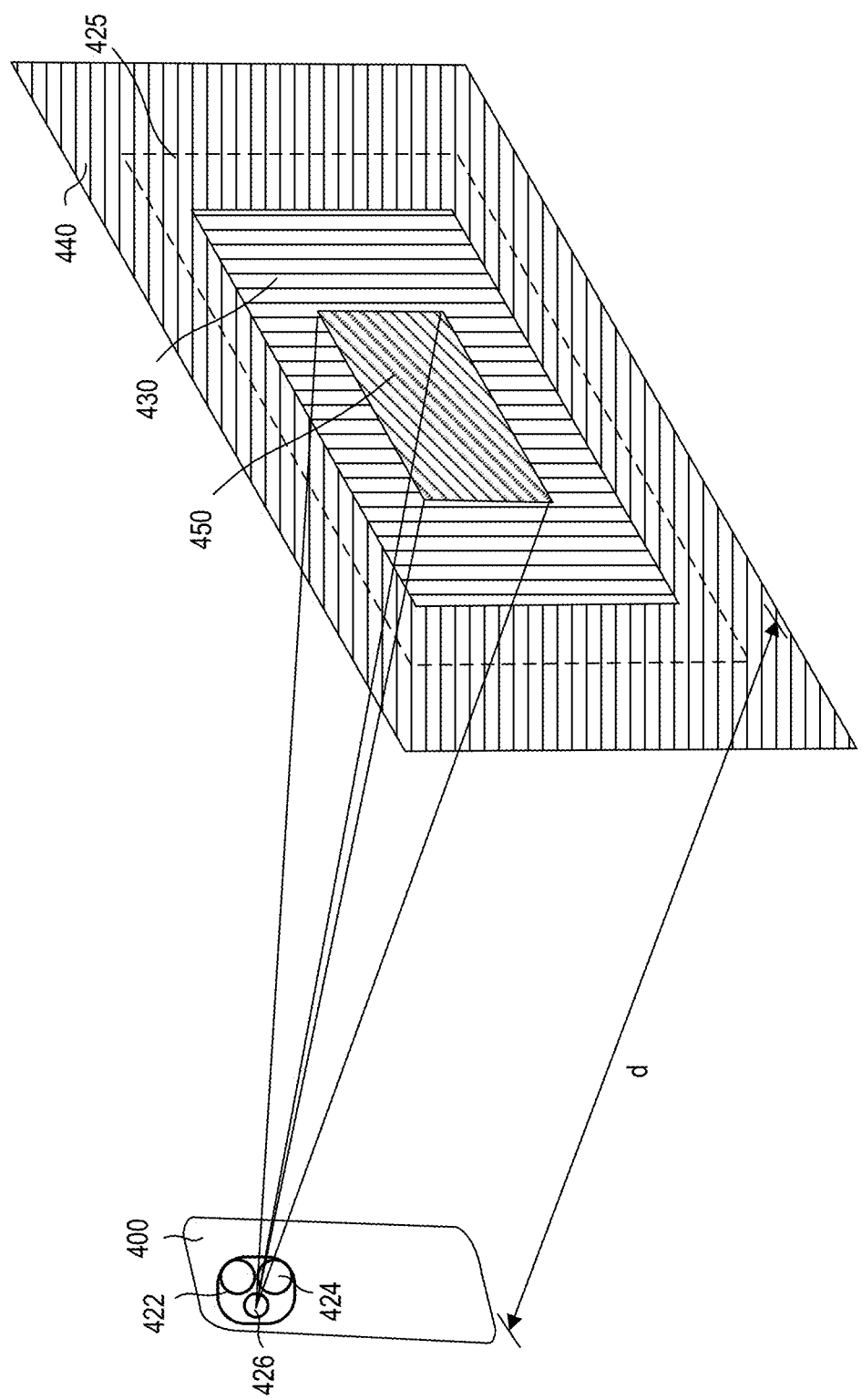
FIG. 4C illustrates a perspective view of fields of view (FOVs) captured by different image sensors, in accordance with some examples of the present disclosure.

Referring to FIG. 4C, a perspective view of the device 400. As illustrated, the FOVs 430, 440 corresponding to the ultra wide-angle lens 422 and wide-angle lens 424, respectively, are illustrated at a distance d from the device 400. In addition, a FOV 450 for the telephoto lens 426 is also illustrated at the distance d from the device 400. In the illustrated example, the FOVs 430, 440 each include all of the FOV 450. In some cases, a camera application on the device 400 can include a zoom functionality. In some cases, a zoom setting of the camera application can correspond to a FOV that is not perfectly aligned with any of the FOVs 430, 440, 450. For example, the FOV 425 can correspond to a particular zoom setting available in the camera application. In one illustrative example, for the FOV 425, a first image captured through the ultra wide-angle lens 422 (corresponding to view 430) and a second image captured through the wide-angle lens 424 (corresponding to view 440) can be combined into a single image to produce an image corresponding to the zoom setting of the camera application.

Figure 4D:
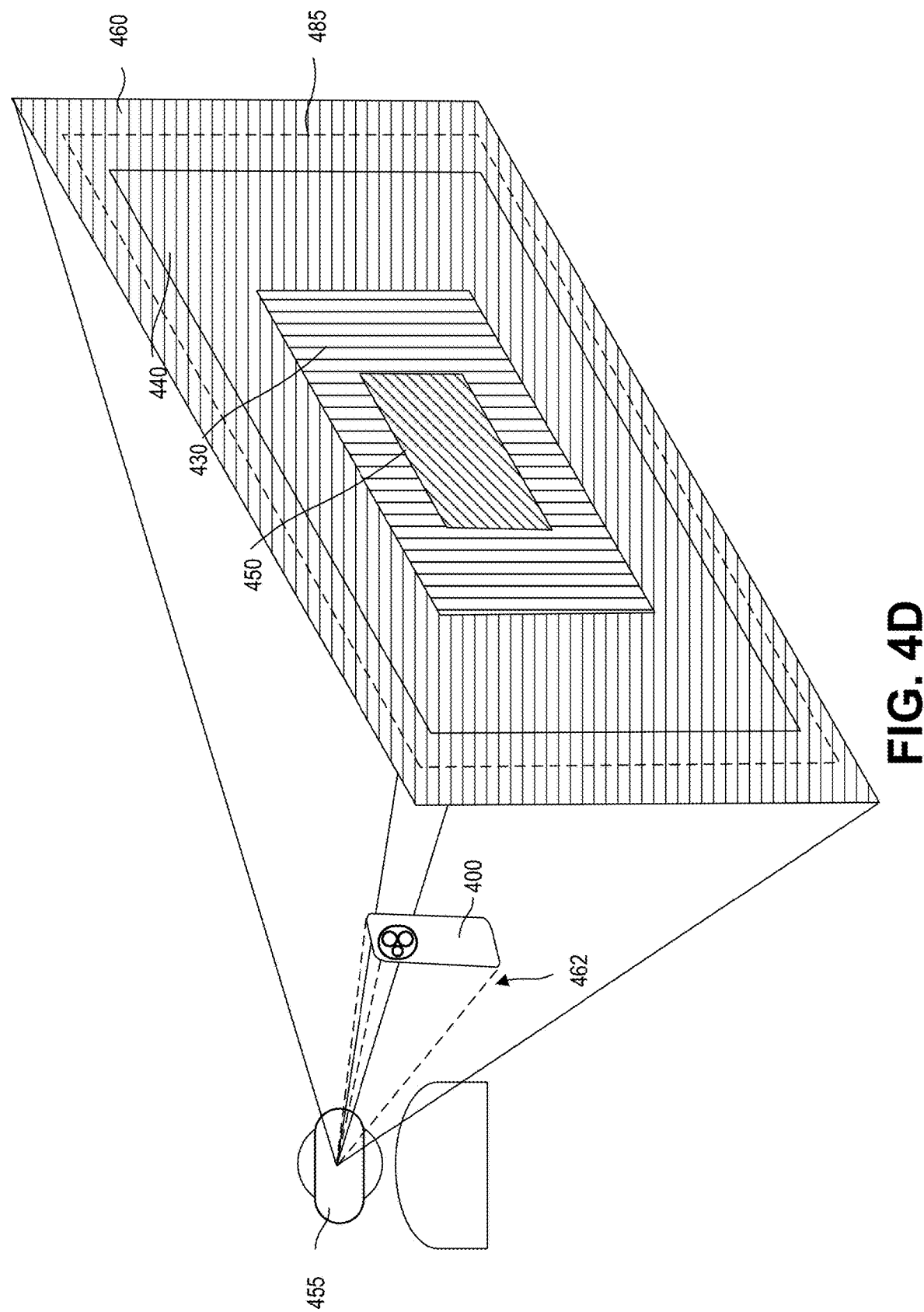
FIGS. 4D and 4E illustrate a perspective view of FOVs captured by image sensors of different electronic devices, in accordance with some examples of the present disclosure.

Referring to FIG. 4D, in some cases, a camera of an HMD 455 (e.g., XR system 200 of FIG. 2) can capture images of a scene (e.g., by one or more image sensors 202) while one or more cameras of the device 400 capture images of the scene. In some implementations, a FOV 460 associated with a camera of the HMD 455 can include all of the FOVs 430, 440, 450. In some cases, a portion 462 of the FOV 460 of the HMD 455 can be obstructed by one or more objects. As illustrated, the device 400 can obstruct the FOV 460. Other example occlusions can include, without limitation, portions of a human body, (e.g., arms, hands, or the like), a mechanical fixture (e.g., a tripod, a telescoping mounting structure, a gimbal system, or the like).

FIG. 4D illustrates an example FOV 485 that is larger than the FOV 440 and smaller than the FOV 460. In some cases, the HMD 455 and device 400 can exchange data over a communication interface (e.g., wired or wireless). In some cases, the HMD 455 and device 400 can exchange image frames (or a sequence of frames). In some cases, an aperture fusion engine (e.g., aperture fusion engine 600 of FIG. 6) can combine images captured by the HMD 455 and device 400 to generate a combined image corresponding to the FOV 485.

Figure 4E:
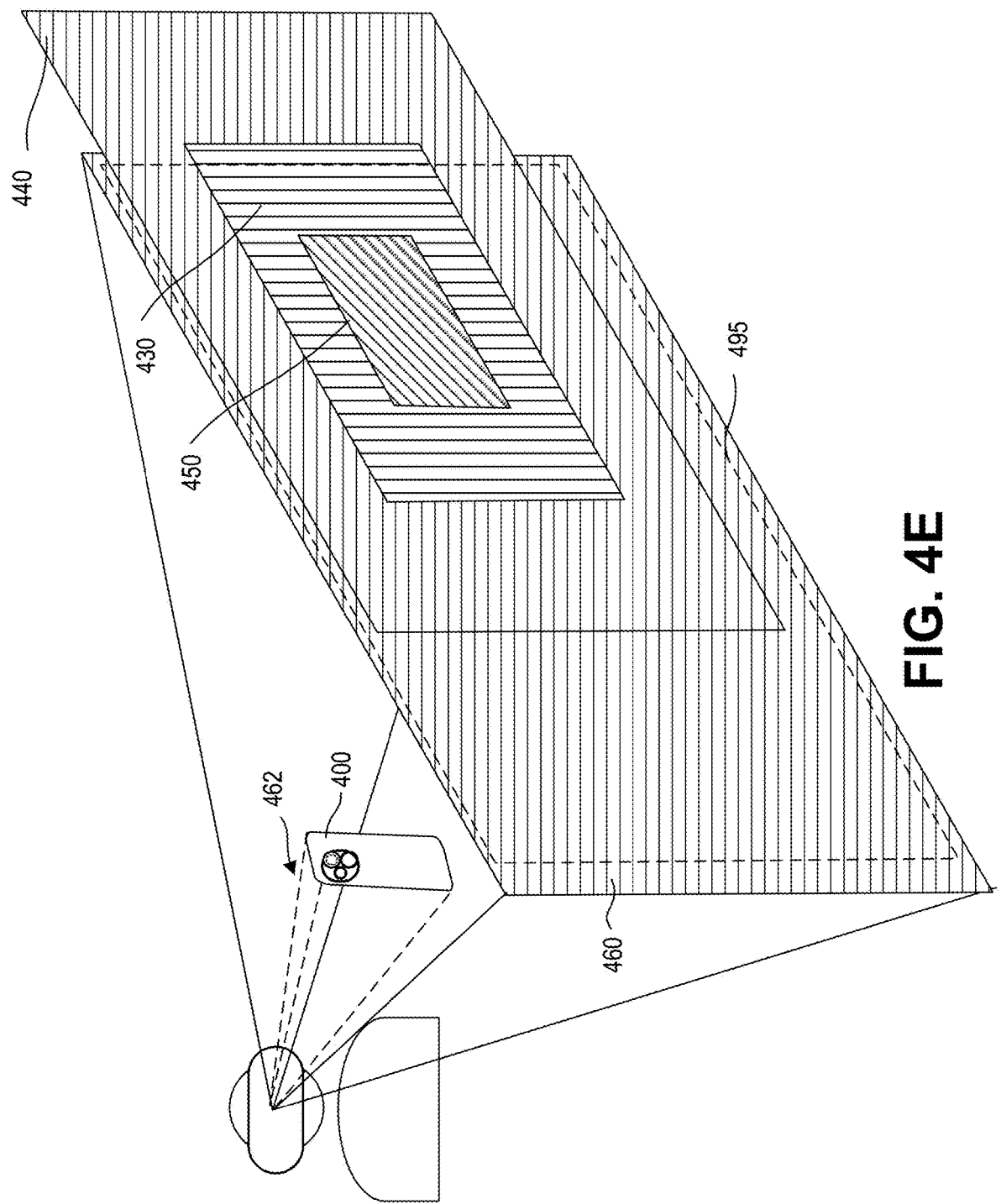

FIG. 4E illustrates an example of a misalignment between the FOV 460 of the HMD 455 and the FOVs 430, 440, and 450 of the device 400. As illustrated, an example target FOV 495 may partially overlap with the FOVs 430, 440, and 450 of the device 400. In some cases, the HMD 455 and device 400 can exchange localization information over the communications link. In some cases, the aperture fusion engine (e.g., aperture fusion engine 600 of FIG. 6) can obtain the localization information as an input to improve generation of the combined image.

In some cases, a user (e.g., a user of the HMD 455) may not be aware of a misalignment between the FOV 460 and the FOVs 430, 440, 450. FIG. 8A and FIG. 8B illustrate an example indicator 810 for indicating a misalignment between cameras operating together as part of an aperture fusion system (e.g., aperture fusion system 500 of FIG. 5). As illustrated in FIG. 8A, a FOV 850 associated with a device 800 and a FOV 860 associated with an HMD (e.g., HMD 455 of FIG. 4E) can be misaligned relative to a scene 803. In some cases, the HMD and/or the device 800 can determine that the FOV 850 and the FOV 860 are misaligned. In some cases, the HMD and/or the device 800 can generate an indicator for assisting with alignment between cameras operating together as part of the aperture fusion system. In one illustrative example, the indicator 810 can be displayed on a display of the HMD (e.g., display 209 of FIG. 2). As illustrated, the indicator 810 can indicate an adjustment (e.g., shifting, rotating, moving, or the like) for adjusting the device 800 to align the FOV 850 and the FOV 860. In another example, the indicator 810 can indicate an adjustment for adjusting the HMD, the device 800, and/or both to align the FOV 850 and the FOV 860. Other types of indicators may also be used to indicate an adjustment, including, without limitation, audio, haptic, or the like. FIG. 8B illustrates the FOVs 850 and 860 after adjustment of the relative position between the HMD and the device 800. As indicated, the HMD can remove the indicator 810 after the FOVs 850 and 860 are within a target amount of alignment relative to the scene 803.

In some cases, an aperture fusion system (e.g., aperture fusion system 500 of FIG. 5) can be configured to automatically control capturing images based on the indicator 810 and/or the target amount of alignment relative to the scene 803. For example, in some cases, the aperture fusion system 500 can suspend image fusion and/or image capture when the amount of alignment between the FOVs 850 and 860 falls below the target amount of alignment. In some implementations, the aperture fusion system may 500 suspend image fusion and/or capture while the indicator 810 is indicating an adjustment. For example, in some cases, the aperture fusion system 500 may output an image captured by one of the cameras operating as part of the aperture fusion system (e.g., aperture fusion system 500 of FIG. 5) while the other camera is misaligned with the scene 803. In some cases, the aperture fusion system 500 can begin (or resume) image fusion and/or image capture when the FOVs 850 and 860 are within the target amount of alignment. In some implementations, the aperture fusion system (e.g., aperture fusion system 500 of FIG. 5) may begin (or resume) image fusion and/or image capture when the indicator 810 is removed.

For example, in some cases, an amount of alignment can be determined based on one or more photogrammetric techniques. In some cases, features can be extracted from the images captured by the HMD and the device 800. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof. In some examples, the features detected in each of the two images can be matched using any suitable feature matching technique. In one illustrative example, a K-nearest neighbors (KNN) algorithm can be used to classify the features. In some cases, distances between features with matching classifiers in both images can be used to determine an amount of alignment between the FOVs 850, 860.

In another illustrative example, alignment based on relative pose between the HMD and the device 800 can be used to determine alignment. For example, ray tracing (e.g., using rays originating from the pose of the HMD and the device 800) can be used to determine the alignment. In another example, an amount of alignment can be determined based on an amount of overlap between the FOVs 850 and 860.

Figure 5:
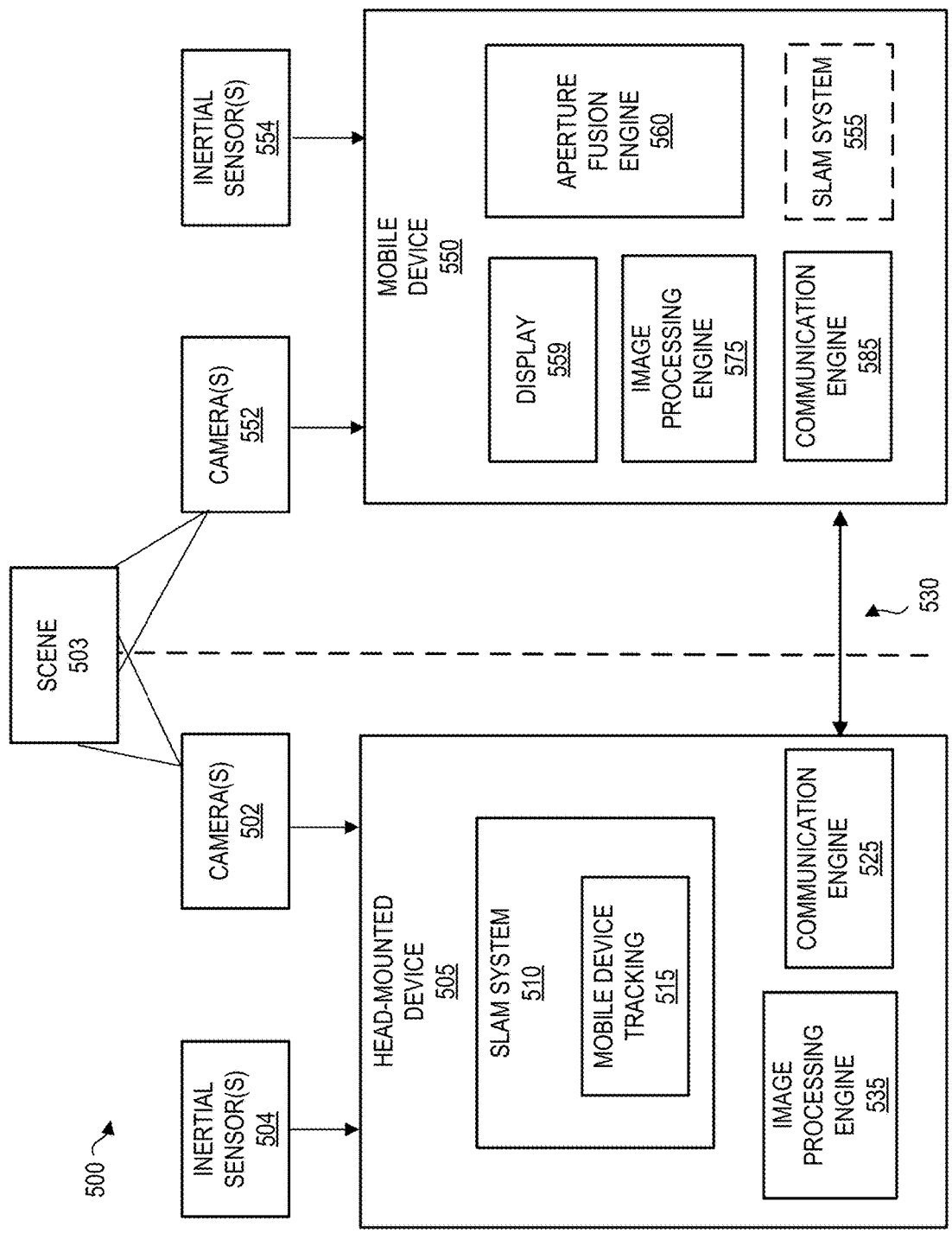
FIG. 5 is a block diagram illustrating an example aperture fusion system, in accordance with some examples of the present disclosure.

FIG. 5 is a block diagram illustrating an aperture fusion system 500. The aperture fusion system 500 includes an HMD 505 and a mobile device 550. The HMD 505 can include one or more cameras 502, one or more inertial sensors 504, a SLAM system 510, a mobile device tracking engine 515, a communication engine 525, and an image processing engine 535. The mobile device 550 can include one or more cameras 552, one or more inertial sensors 554, display 559, an aperture fusion engine 560, an image processing engine 575, and a communication engine 585. In some implements, the mobile device 550 can optionally include a SLAM system 555. The display 559 can include a glass, a screen, a lens, a projector, and/or other display mechanism that allows a user to see images displayed thereon.

In some cases, the HMD 505 can be an example of the XR system 200 of FIG. 2. For example, the one or more cameras 502 can correspond to image capture device 105A, image processing device 105B, image sensor 130, image sensor 202, and/or cameras 310. In some cases, the one or more inertial sensors 504 can correspond to the accelerometer 204, gyroscope 206, and/or any other inertial sensor. In some cases, the SLAM system 510 of HMD 505 can be similar to and perform similar functions to XR system 200 of FIG. 2, and/or SLAM system 300 of FIG. 3. The communication engine 525 can correspond to the communications engine 228. The image processing engine 535 can be similar to and perform similar functions to the image processing engine 224. The communication engine 525 can correspond to the communications engine 228. The image processing engine 535 can be similar to and perform similar functions to the image processing engine 224.

In the illustrated example of FIG. 5, the SLAM system 510 includes a mobile device tracking engine 515 that can be used to track a pose (e.g., localization information) specifically for a mobile device mobile device 550 operating cooperatively with the HMD 505 in the aperture fusion system 500. In some cases, the mobile device tracking engine 515 can, for example, be configured to detect specific features associated with handheld devices, such as the presence of a display 559, edges, corners, or the like. In some implementations, the mobile device tracking engine 515 can be configured to detect special tracking indicators displayed on the display 559. For example, FIG. 7 illustrates an example of a tracking indicator 760 displayed on a display 759 of a mobile device 750. In some cases, the mobile device tracking engine 515 can be configured to detect a camera application, 770. For example, the mobile device tracking engine 515 can detect a camera preview, user interface elements, or the like.

The communication engine 525 of the HMD 505 and the communication engine 585 of the mobile device 550 can communicate over a (wired or wireless) communications link 530. In some cases, the communications link 530 can be bidirectional. In some cases, the HMD 505 and/or the mobile device 550 can transmit localization information (e.g., from the SLAM system 510, mobile device tracking engine 515, and/or SLAM system 555) over the communications link 530. For example, the localization information can include pose information for the mobile device 550 determined by the mobile device tracking engine 515. As another example, the localization information can include a SLAM map and/or a pose of the HMD 505. In some cases, the localization information can include a combined map based on SLAM maps for the mobile device 550 and HMD 505. In some cases, the HMD 505 and/or the mobile device 550 can transmit image frames (e.g., a stream of images, video data, still images). For example, in the illustrated configuration of FIG. 5, video data from the HMD 505 can be processed by image processing engine 535 and transmitted to the mobile device 550 by the communications link. The examples of communications between the communication engine 525 and communication engine 585 provided herein are non-limiting and provided as examples. In some cases, more, fewer, and/or different information can be communicated over the communications link 530 without departing from the scope of the present disclosure.

In some cases, the SLAM system 555 of mobile device 550 can be similar to and perform similar functions to XR system 200 of FIG. 2, and/or SLAM system 300 of FIG. 3. The aperture fusion engine 560 can be used to combine an image (or a sequence of images) of a scene 503 captured by the one or more cameras 502 of the HMD 505 and an image (or a sequence of images) of the scene 503 captured by the one or more cameras 552 into a combined image.

Figure 6:
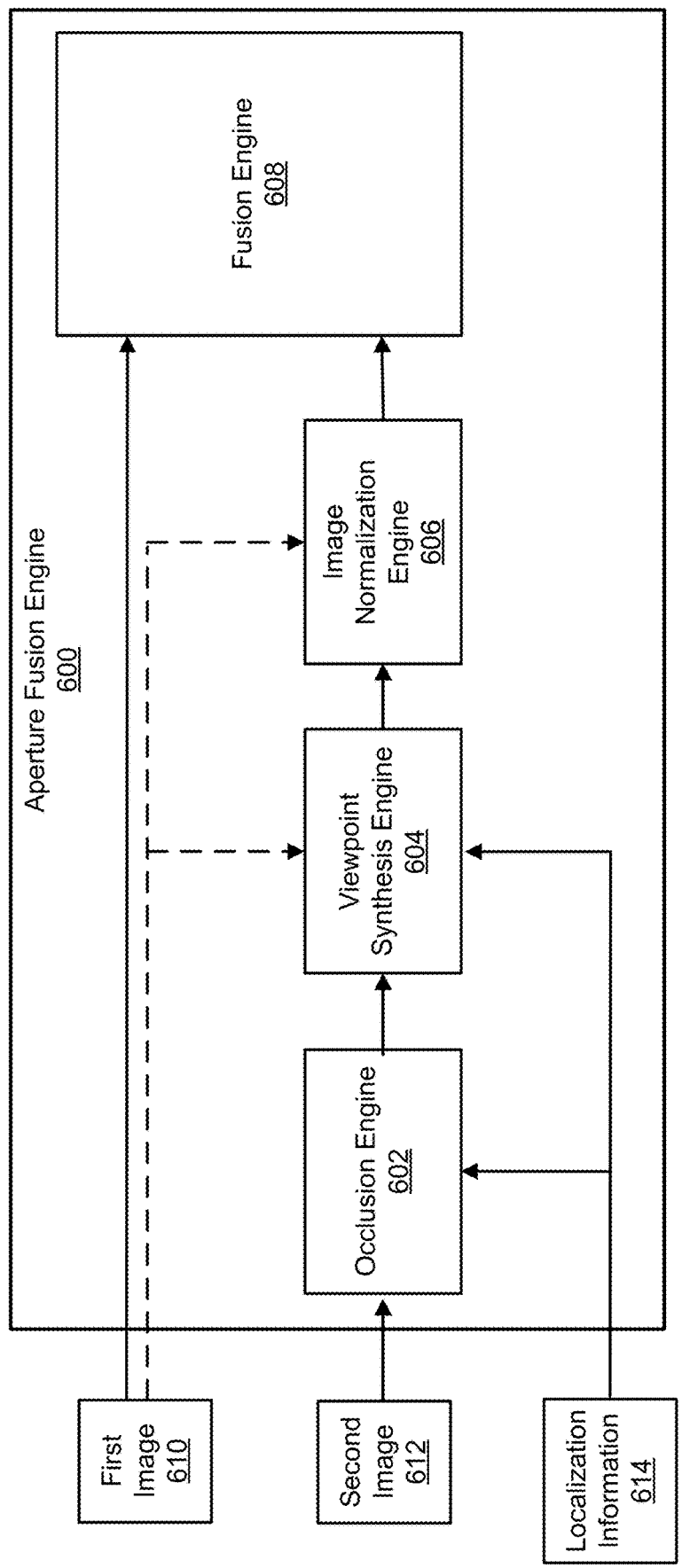
FIG. 6 is a block diagram illustrating an example aperture fusion engine, in accordance with some examples of the present disclosure.

FIG. 6 is a block diagram illustrating an architecture of an aperture fusion engine 600. The aperture fusion engine 600 can correspond to the aperture fusion engine 560 of FIG. 5. The aperture fusion engine 600 includes various components that are used to generate a combined image (also referred to as a fused image herein) based on two or more input images. For the purposes of illustrating, the example aperture fusion engine 600 of FIG. 6 received two images, a first image 610 and a second image 612 as input. For an example, the first image 610 can be an image captured by a camera of a first device (e.g., the mobile device 550 of FIG. 5) and the second image 612 can be an image captured by a separate second device (e.g., the HMD 505 of FIG. 5). In some cases, the first image 610 may be an image captured by a single camera of the first device and/or the second image 612 may be an image captured by a single camera of the second device. In some cases, the first image 610 can be a combined image from multiple cameras of the first device and/or the second image 612 can be a combined image from multiple cameras of the second device. In one illustrative example, the first image 610 may be a combination of an image captured by a first image sensor with a wide-angle lens (e.g., wide-angle lens 424 of FIG. 4C) and an additional image captured by a second image sensor with an ultra-wide angle lens (e.g., ultra wide-angle lens 422 of FIG. 4) as described with respect to FIG. 4C. The aperture fusion engine 600 can also obtain localization information 614 as input. The localization information 614 can include, without limitation, a pose of the HMD (e.g., determined by SLAM system 510), a pose of the mobile device (e.g., determined by SLAM system 510, mobile device tracking engine 515 and/or SLAM system 555). In some cases, the HMD and the mobile device can share SLAM map information (e.g., determined as part of a SLAM operation).

In some cases, the aperture fusion engine 600 can implement various types of machine learning algorithms to generate combined images based on two or more input images. In some implementations, the occlusion engine 602, viewpoint synthesis engine 604, image normalization engine 606, fusion engine 608, and/or any combination thereof can be trained utilizing a deep generative neural network model (e.g., generative adversarial network (GAN)). A GAN is a form of generative neural network that can learn patterns in input data so that the neural network model can generate new synthetic outputs that reasonably could have been from the original dataset.

A GAN can include two neural networks that operate together. One of the neural networks (referred to as a generative neural network or generator denoted as G(z)) generates a synthesized output, and the other neural network (referred to as a discriminative neural network or discriminator denoted as D(X)) evaluates the synthesized output for authenticity (whether the synthesized output is from an original dataset, such as the training dataset, or is generated by the generator). The generator G(z) can correspond to the occlusion engine 602, viewpoint synthesis engine 604, image normalization engine 606, fusion engine 608, and/or any combination thereof. The generator is trained to try and fool the discriminator into determining a synthesized image (or group of images) generated by the generator is a real image (or group of images) from a training dataset (e.g., the first group of training images). The training process continues, and the generator becomes better at generating the synthetic images that look like real images. The discriminator continues to find flaws in the synthesized images, and the generator figures out what the discriminator is looking at to determine the flaws in the images. Once the network is trained, the generator is able to produce realistic looking images that the discriminator is unable to distinguish from the real images.

There is a dueling aspect between the generator G and the discriminator D that is maximized with respect to the parameters of the discriminator D. The discriminator D will try to discriminate between real images (from a group of training data) and fake images (generated by the generator G based on a second group of training images) as well as possible, and the generator G should minimize the ability of the discriminator D to identify fake images. Parameters of the generator G (e.g., weights of the nodes of the neural network and in some cases other parameters, such as biases) can be adjusted during the training process so that the generator G will output video frames that are indistinguishable from real video frames associated with the second domain. A loss function can be used to analyze errors in the generator G and discriminator D. In some cases, separate loss functions can be provided for the generator G and the discriminator D. In one illustrative example, a binary cross-entropy loss function can be used. Other loss functions can be used in some cases. In some examples, a single minimax function can be used by both the generator G and discriminator D. The generator G and discriminator D can be adjusted with opposing objectives relative to the minimax function. In one illustrative example, parameters for the generator G can be adjusted to minimize (or maximize) the minimax function and parameters for the discriminator D can be adjusted to maximize (or minimize) the minimax function.

In some cases, the machine learning algorithm for the occlusion engine 602, viewpoint synthesis engine 604, image normalization engine 606, fusion engine 608, any portion thereof, and/or any combination thereof can include, without limitation, a Transformer, a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof. The machine learning algorithm may be a supervised learning algorithm, an unsupervised learning algorithm, a semi-supervised learning algorithm, any combination thereof, or other learning techniques.

As illustrated in FIG. 6, the occlusion engine 602 can obtain the second image 612 (e.g., from HMD 500 of FIG. 5). The second image can include one or more obstructions such as the mobile device (e.g., mobile device 550 of FIG. 5), portions of a human body, and/or a mechanical fixture. In some cases, the occlusion engine 602 can extract features from the second image and classify one or more objects based on the extracted features. In some cases, the occlusion engine 602 can perform a semantic segmentation. In semantic segmentation, the occlusion engine 602 can associate each object in a scene with one or more classifications (also referred to herein as labels). In some cases, if more than one object has the same label, semantic segmentation does not differentiate between the two objects.

In some cases, once one or more obstructions are classified based on the second image 612, the occlusion engine 602 can replace pixels of the second image to remove the obstructions. In some implementations, the occlusion engine 602 can perform an inpainting process to replace the pixels that were previously occupied by the unwanted object in the input image. In some cases, the occlusion engine 602 can receive localization information 614 that can be used during determination of the location of an obstruction (e.g., mobile device 550 of FIG. 5).

As noted above, in some cases, the occlusion engine 602 can be implemented with a GAN. During training, a generator G for a GAN can receive an input image with an occlusion (e.g., an object blocking a portion of a scene captured in the input image) and generate an output image with the occlusion removed and the goal of the GAN is to generate realistic images with occlusions removed. For example, an input image can include at least one or more of a mobile device (e.g., mobile device 550 of FIG. 5), portions of a human body (e.g., arms, hands, or the like), or a mechanical fixture (e.g., a tripod, a telescoping mounting structure, a gimbal system, or the like). In some cases, the loss function for the generator G can include a loss term that penalizes the generated image for being different from the second image 612 for the non-obstructed portions of the second image 612. For example, the generator G should generate an image that has a similar or identical appearance to the second image 612, except for the pixels corresponding to any obstructions. The discriminator D will try and discriminate between real images without occlusions (e.g., from a training dataset) and fake images generated by the generator G based on images with occlusions (e.g., from a second training dataset). For example, the training dataset can include images from of different scenes captured by one or more cameras (e.g., from HMD 505 of FIG. 5, and/or one or more additional cameras) without any occlusions. In one illustrative example, images of the same scenes with occlusions (e.g., occluded by mobile device 550 of FIG. 5) can be input to the generator G and the resulting output images can be included in the second training dataset.

During inference, (e.g., after the generator G has been trained to generate realistic images with obstructions removed), the occlusion engine 602 can obtain the second image 612 and generate a realistic image without the obstructions. In one illustrative example, the occlusion engine 602 can perform an inpainting operation to generate pixel values for portions of the scene that were occluded in the second image 612. In the illustrated example of FIG. 6, the image generated by the occlusion engine 602 can be provided as an input to the viewpoint synthesis engine 604.

In another illustrative example, the occlusion engine 602 may be trained using a supervised learning process. For example, a training dataset may include images with obstructions and images with the obstructions removed by a skilled artist. In some cases, the images with obstructions could be input into the occlusion engine 602 and the occlusion engine 602 can generate an output image with the occlusions removed. In some cases, a loss function can penalize differences between the images output by the occlusion engine 602 and the training dataset images with the obstructions removed.

In one illustrative example, images of a scene can be captured by a mobile device and an HMD. In some cases, the images captured by the HMD may be occluded by the mobile device (e.g., when the mobile device is held in front of the wearer of the HMD). In some cases, the occlusion engine 602 can remove the obstruction (e.g., the mobile device) from the image captured by the HMD. Other types of indicators may also be used to indicate an adjustment, including, without limitation, audio, haptic, or the like.

The viewpoint synthesis engine 604 can be configured to obtain the first image 610, the second image 612, and the localization information 614 to generate an image with a novel viewpoint. In some cases, the novel viewpoint can correspond to the viewpoint represented in the first image 610 (e.g., the viewpoint of mobile device 550 of FIG. 5). In some cases, the novel viewpoint can correspond to the viewpoint of the second image 612 (e.g., the viewpoint of HMD 505 of FIG. 5). For the purposes of illustration, the operation of the viewpoint synthesis engine 604 will described with respect to a novel viewpoint corresponding to the viewpoint of the first image. In some cases (not shown), the novel viewpoint can be the same as the viewpoint of the second image 612. In some cases, the novel viewpoint can be different from the viewpoint of the first image 610 or the viewpoint of the second image 612. In some cases, the viewpoint synthesis engine 604 can be configured to generate a transformation between the viewpoint contained in the first input image first image 610 and/or the second image 612 and the novel viewpoint.

As noted above, the viewpoint synthesis engine 604 can be implemented with a GAN. As one illustrative example, during training, a generator G for a GAN can receive a set of images (e.g., from a second training dataset) of an area captured from different viewpoints and generate an output image of the area from a novel viewpoint and the goal of the GAN is to generate realistic images from the novel viewpoint. The discriminator D will try and discriminate between real images (e.g., from a training dataset) and fake images generated by the generator G from a novel viewpoint (e.g., from a second training dataset). In one illustrative example, the training dataset can include images captured by an HMD (e.g., HMD 505 of FIG. 5). In some cases, the second training dataset can be generated by the generator G from a first image (e.g., from mobile device 550 of FIG. 5) and a second image (e.g., from HMD 505 of FIG. 5). In some cases, images output by the generator G can have the appearance of being captured from the novel viewpoint. In some cases, the discriminator D can receive a set of images that can include either all images from the training dataset or can include images from the training dataset combined with the fake images generated by the generator G. In some cases, the discriminator D can determine whether the set of images are all real or whether the set of images contains a fake image.

During inference, the viewpoint synthesis engine 604 can generate images from the novel viewpoint based on the first image 610, the output of the occlusion engine 602, and the localization information 614. For example, the localization information 614 can be used as part of the determination of a transformation of the second image 612 into the viewpoint of the first image 610. In some cases, localization information can be used to determine relative poses between electronic devices that are not rigidly attached to one another such that the relative poses can change. In some cases, the electronic devices can be connected with a non-rigid connection. For example, the body of a user can be considered a non-rigid connection between an HMD worn by a user and a handheld mobile device. As another example, localization information can include a relative pose change can occur between a stationary camera (e.g., a camera on a tripod, an IP camera, or the like) and a non-stationary camera (e.g., in a handheld and/or wearable device). In one illustrative example, the localization information 614 can include a pose of an HMD (e.g., HMD 505 of FIG. 5), a pose of a mobile device (e.g., mobile device 550 of FIG. 5), a relative pose between an HMD and a mobile device, any other localization information, and/or any combination thereof.

In some cases, an indicator (e.g., indicator 810 of FIG. 8A) for indicating an adjustment (e.g., shifting, rotating, moving, or the like) between the first image sensor and the second image sensor to correct the misalignment. In some examples, the indicator can be generated based on the localization information 614. In some cases, the indicator can be displayed on a display of the HMD, mobile device, or both.

As illustrated in FIG. 6, the image normalization engine 606 can receive an output image from the viewpoint synthesis engine 604 with the novel viewpoint and the first image 610 as inputs. In some case, the image normalization engine 606 can be configured to normalize the two input images. In some cases, normalizing the input images can include accounting for different image properties in the input images to produce an output image that appears to be captured by a single camera. For example, a camera included in an HMD (e.g., HMD 505 of FIG. 5) may produce images with different image properties than a camera included in a mobile device (e.g., mobile device 550 of FIG. 5). Example image properties include, without limitation, resolution, brightness, white balance, color balance, focus, depth of field, FOV, distortion, and/or any other image properties. In some cases, the image normalization engine 606 can be configured to normalize different illumination conditions that may be present in the input images.

As noted above, the image normalization engine 606 can be implemented with a GAN. As one illustrative example, during training, a generator G for a GAN can receive a set of images (e.g., from a training dataset) having uniform image properties and generate a normalized output image based on two input images (e.g., an image captured by an HMD and an image captured by a mobile device) with non-uniform image properties and the goal of the GAN is to generate realistic images with uniform image properties. The discriminator D will try and discriminate between real images (e.g., from a training dataset) and fake images generated by the generator G (e.g., from a second training dataset).

In another illustrative example, the image normalization engine 606 can be trained using a supervised learning process. For example, the image normalization engine can receive a training dataset that includes pairs of input images with non-uniform image properties and normalized images generated based on the pairs of input images produced by a skilled artist. In some cases, a loss function can penalize the image normalization engine 606 based on differences between the images produced by the image normalization engine 606 and the normalized images included in the training dataset.

During inference, the image normalization engine 606 can receive two images as input (e.g., the output of viewpoint synthesis engine 604 and first image 610) and generate a normalized output image based on the input images.

As illustrated in FIG. 6, fusion engine 608 can receive first image 610 and the output of image normalization engine 606 as inputs and generate an output image with a realistic appearance. For example, the fusion engine 608 can be configured to select between a pixel of the first image 610 and a pixel of the output image from the image normalization engine 606 for each pixel location and use the selected pixel value in the output image. In some cases, the fusion engine 608 can be configured to blend pixel information at a pixel location based on a pixel of the first image 610 and a pixel of the output image from the image normalization engine 606 at the same pixel location. In some cases, the fusion engine 608 can generate an output pixel value based on a weighted sum of two input pixel values at each pixel location. In some cases, the fusion engine 608 can output an image that includes pixel information from the first image 610 and the second image 612 with occlusions removed, from the novel viewpoint, with a normalized appearance (e.g., having uniform image properties) that has the appearance of being captured by a single camera.

While the example aperture fusion engine 600 of FIG. 6 describes separate machine learning models for the occlusion engine 602, viewpoint synthesis engine 604, image normalization engine 606, other configurations can be used without departing from the scope of the present disclosure. For example, in some cases, the occlusion engine 602, viewpoint synthesis engine 604, and image normalization engine 606 can be combined into a single machine learning model. In some cases, more or fewer machine learning models can be used without departing from the scope of the present disclosure. In some cases, one or more functions of the aperture fusion engine 600 can be allocated between one or more machine learning models differently from the configuration shown in FIG. 6.

In some cases, the aperture fusion engine 600 can be used to combine images captured by separate devices from different FOVs as described with respect to FIGS. 4D-4E. For example, for the zoom level corresponding to FOV 485, the aperture fusion engine 600 can generate an output image based on a first image 610 captured through the ultra wide-angle lens 422 and a second image captured by the HMD 455. As a result, in addition to changes in localization between non-connected devices, the aperture fusion engine 600 can also be used to provide smooth transition between zoom levels that fall between the FOVs of different cameras included in an aperture fusion system including multiple separate devices (e.g., aperture fusion system 500).

Returning to FIG. 5, the illustrated example aperture fusion system 500 of FIG. 5 shows the aperture fusion engine 560 included in the mobile device 550. In some cases, the computational resources of an HMD 505 included in the aperture fusion system 500 can be constrained by thermal requirements, battery power, and/or other constraint. In some cases, it can be desirable to include the aperture fusion engine 560 in the mobile device 550, which may have different constraints. However, it should be understood that the aperture fusion techniques described herein can be performed by the HMD 505, mobile device 550, a server, the computing system 1300 of FIG. 13, any other separate device, and/or any combination thereof.

An example operation with reference to an embodiment of the systems and techniques described herein will now be provided. In a first step, a user may be interested in capturing one or more images or videos of a scene. The user may be wearing an HMD (e.g., HMD 505 of FIG. 5) with a first camera and have access to a mobile device (e.g., a smartphone) having a second camera. The aperture fusion system may receive localization information (e.g., localization information 614) from the HMD and/or the mobile device. The user may initiate capture of one or more images or videos of the scene on the mobile device (e.g., by providing input via a user interface of a camera application). The first camera included in the HMD may also capture images or videos of the scene from a different perspective. The perspective of the mobile device relative to the HMD may change over time. For example, the user may initially be holding the mobile device with arms extended in front of the torso of the user. In such an example, the mobile device with the second camera may be lower than the HMD with the first camera. The mobile device may also be at a different distance (e.g., closer or farther away) from the scene than the HMD. At a different time, the user may hold the mobile device in an outstretched arm above their head. When held above the user's head, the mobile device may be higher than the HMD. The mobile device may be at a same distance (e.g., approximately aligned to the HMD, held directly above the HMD) or at a different distance (e.g., closer or farther away) from the scene than the HMD. For example, the user may wish to capture an image of a scene obstructed by one or more people, objects, and/or any some other obstruction by holding the mobile device overhead.

In the example embodiment, an aperture fusion system receives a first image captured from the first camera of the HMD and a second image captured from the second camera of the mobile device as input. The aperture fusion system receives localization information (e.g., localization information 614) from the HMD and/or the mobile device. In some positions, the mobile device and/or portion of the user's body may occlude the first image of the scene captured by the first camera of the HMD (e.g., device 400 of FIG. 4B). The aperture fusion system can remove the occlusion or obstruction (e.g., by occlusion engine 602 of FIG. 6) and output the resulting image with the occlusion removed. As described herein, the occlusion engine performs feature detection and/or object classification to determine the presence and location of the occlusion(s) in the first image. In addition or as an alternative, the occlusion engine uses the localization information (e.g., the position of the mobile device) to determine the location of the occlusion(s) in the first image. In some cases, the occlusion engine can remove the occlusion based on the determined location based on the localization information. The aperture fusion system processes the HMD image with the occlusion removed and provides an image from the second camera included in the mobile device to a viewpoint synthesis engine (e.g., viewpoint synthesis engine 604 of FIG. 6). The viewpoint synthesis engine generates an image from a synthesized viewpoint based on the first image, the second image, and/or the localization information. In the example embodiment, the synthesized viewpoint is identical the viewpoint of the first image.

The synthesized viewpoint image and the second image are normalized by an image normalization engine (e.g., image normalization engine 606 of FIG. 6), The normalization engine generates a normalized image with uniform image properties to provide the appearance that the normalized image was captured by a single camera. In the example embodiment, the normalized image has image properties consistent with the image properties of the second image from the mobile device. A fusion engine (e.g., fusion engine 608 of FIG. 6) may generate a combined image based on the second image and the normalized image. The combined image can be output to a display (e.g., a display included in the HMD, a display of the mobile device) and/or stored in storage (e.g., computing system 1300, RAM 1325, and/or cache 1312 of FIG. 13).

In the example embodiment, the aperture fusion system provides combined images of a scene even as the relative pose between the HMD and the mobile device changes. If either the first camera of the HMD or the second camera of the mobile device becomes misaligned with the scene, the aperture fusion system generates an indicator (e.g., indicator 810 of FIG. 8A) that provides an indication of an adjustment of the HMD, the mobile device, or both. The aperture fusion system suspends fusion, and/or image capture when the cameras become misaligned and the indicator is displayed. For example, if the mobile device becomes misaligned with the scene, the HMD image is used in place of a combined image. The aperture fusion system resumes fusion and/or image capture when alignment is restored and the indicator is removed.

Figure 9A:
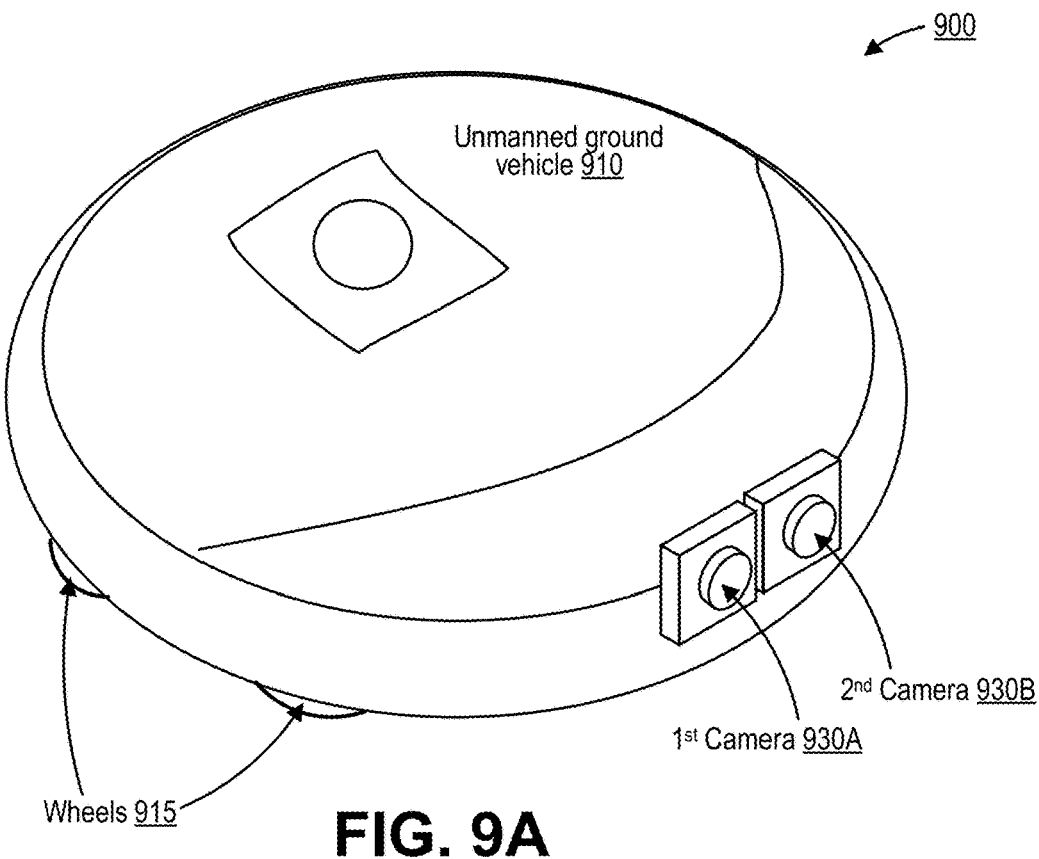
FIG. 9A is a perspective diagram illustrating an unmanned ground vehicle (UGV) that performs feature tracking and/or visual simultaneous localization and mapping (VSLAM), in accordance with some examples.

FIG. 9A is a perspective diagram 900 illustrating an unmanned ground vehicle (UGV) 910 that performs feature tracking and/or visual simultaneous localization and mapping (VSLAM), in accordance with some examples. The UGV 910 illustrated in the perspective diagram 900 of FIG. 9A may be an example of a SLAM system 300. The UGV 910 includes a first camera 930A and a second camera 930B along a front surface of the UGV 910. The first camera 930A and a second camera 930B may be two of the one or more cameras 310. In some examples, the UGV 910 may include one or more additional cameras in addition to the first camera 930A and the second camera 930B. In some examples, the UGV 910 may include one or more additional sensors in addition to the first camera 930A and the second camera 930B. The UGV 910 includes multiple wheels 915 along a bottom surface of the UGV 910. The wheels 915 may act as a conveyance of the UGV 910, and may be motorized using one or more motors that may be actuated by a movement actuator of the UGV 910. The movement actuator, the motors, and thus the wheels 915, may be actuated to move the UGV 910 along a path.

Figure 9B:
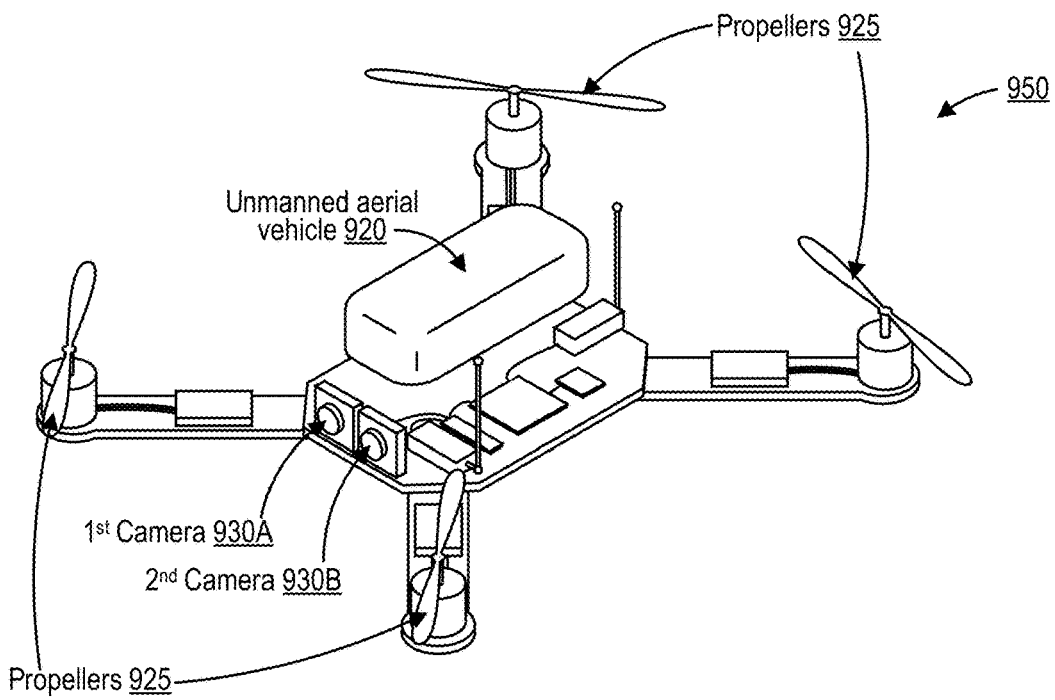
FIG. 9B is a perspective diagram illustrating an unmanned aerial vehicle (UAV) that performs feature tracking and/or VSLAM, in accordance with some examples.

FIG. 9B is a perspective diagram 950 illustrating an unmanned aerial vehicle (UAV) 920 that performs feature tracking and/or visual simultaneous localization and mapping (VSLAM), in accordance with some examples. The UAV 920 illustrated in the perspective diagram 950 of FIG. 9B may be an example of a SLAM system 300. The UAV 920 includes a first camera 930A and a second camera 930B along a front portion of a body of the UAV 920. In some examples, the UAV 920 may include one or more additional cameras in addition to the first camera 930A and the second camera 930B. In some examples, the UAV 920 may include one or more additional sensors in addition to the first camera 930A and the second camera 930B. The UAV 920 includes multiple propellers 925 along the top of the UAV 920. The propellers 925 may be spaced apart from the body of the UAV 920 by one or more appendages to prevent the propellers 925 from snagging on circuitry on the body of the UAV 920 and/or to prevent the propellers 925 from occluding the view of the first camera 930A and/or the second camera 930B. The propellers 925 may act as a conveyance of the UAV 920, and may be motorized using one or more motors that may be actuated by a movement actuator of the UAV 920. The movement actuator, the motors, and thus the propellers 925, may be actuated to move the UAV 920 along a path.

Where the SLAM system 300, such as the UGV 910 or UAV 920, the SLAM system 300 may include a path planning engine and/or a movement actuator. The path planning engine may generate a path along which the vehicle is to move. In some examples, path planning engine may use a Dijkstra algorithm to plan the path. In some examples, the path planning engine may include stationary obstacle avoidance and/or moving obstacle avoidance in planning the path. In some examples, the path planning engine may include determinations as to how to best move the vehicle from a first pose to a second pose in planning the path. In some examples, the path planning engine may plan a path that is optimized to reach and observe every portion of a first region of an environment (e.g., a first set of one or more rooms in the environment) before moving on to a second region of the environment (e.g., the second set of one or more rooms of the environment) in planning the path. In some examples, the path planning engine may plan a path that is optimized to reach and observe a predetermined set of rooms in an environment (e.g., every room in the environment) as quickly as possible. In some examples, the path planning engine may plan a path that returns to a previously-observed room to observe a particular feature again to improve one or more map points corresponding the feature in the local map and/or global map (e.g., to perform a loop closure). In some examples, the path planning engine may plan a path that returns to a previously-observed room to observe a portion of the previously-observed room that lacks map points in the local map and/or global map to see if any features can be observed in that portion of the room. The movement actuator may actuate one or more motors to actuate a motorized conveyance (e.g., the wheels 915 or the propellers 925) to move the vehicle along the path planned by the path planning engine.

Figure 10A:
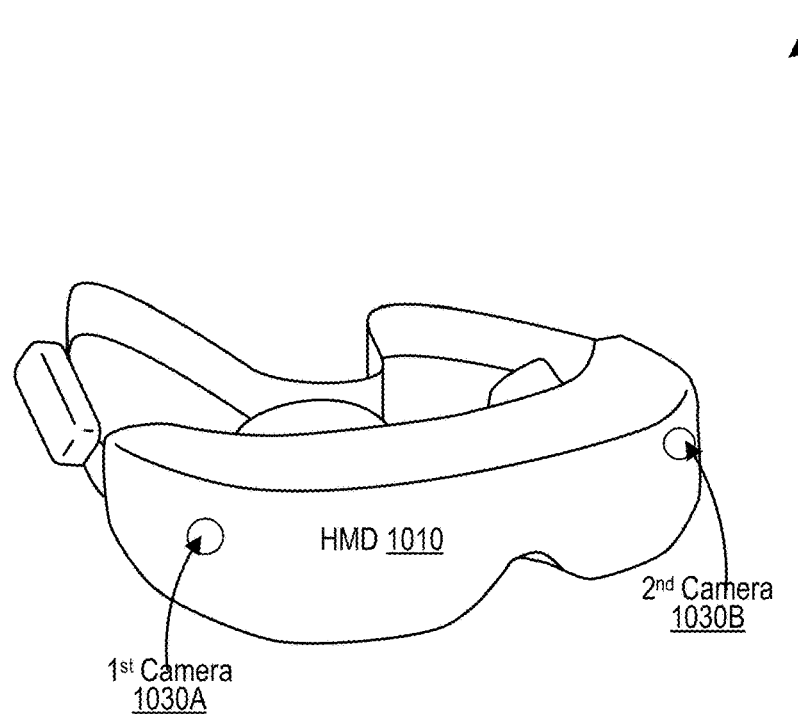
FIG. 10A is a perspective diagram illustrating a head-mounted display (HMD) that performs feature tracking and/or VSLAM, in accordance with some examples.

FIG. 10A is a perspective diagram 1000 illustrating a head-mounted display (HMD) 1010 that performs feature tracking and/or visual simultaneous localization and mapping (VSLAM), in accordance with some examples. The HMD 1010 may be, for example, an augmented reality (AR) headset, a virtual reality (VR) headset, a mixed reality (MR) headset, an extended reality (XR) headset, or some combination thereof. The HMD 1010 may be an example of an XR system 200, a SLAM system 300, an HMD 455, an HMD 505, or a combination thereof. The HMD 1010 includes a first camera 1030A and a second camera 1030B along a front portion of the HMD 1010. The first camera 1030A and the second camera 1030B may be two of image sensor 202. In some examples, the HMD 1010 may only have a single camera. In some examples, the HMD 1010 may include one or more additional cameras in addition to the first camera 1030A and the second camera 1030B. In some examples, the HMD 1010 may include one or more additional sensors in addition to the first camera 1030A and the second camera 1030B.

Figure 10B:
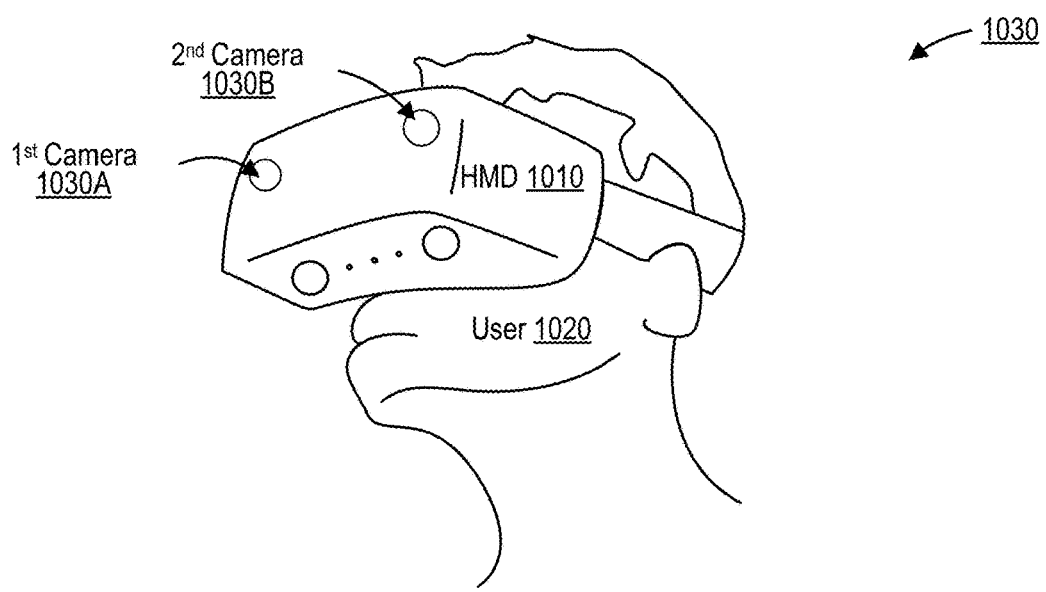
FIG. 10B is a perspective diagram illustrating the HMD of FIG. 9A being worn by a user, in accordance with some examples.

FIG. 10B is a perspective diagram 1030 illustrating the head-mounted display (HMD) 1010 of FIG. 10A being worn by a user 1020, in accordance with some examples. The user 1020 wears the HMD 1010 on the user 1020's head over the user 1020's eyes. The HMD 1010 can capture images with the first camera 1030A and the second camera 1030B. In some examples, the HMD 1010 displays one or more display images toward the user 1020's eyes that are based on the images captured by the first camera 1030A and the second camera 1030B. The display images may provide a stereoscopic view of the environment, in some cases with information overlaid and/or with other modifications. For example, the HMD 1010 can display a first display image to the user 1020's right eye, the first display image based on an image captured by the first camera 1030A. The HMD 1010 can display a second display image to the user 1020's left eye, the second display image based on an image captured by the second camera 1030B. For instance, the HMD 1010 may provide overlaid information in the display images overlaid over the images captured by the first camera 1030A and the second camera 1030B.

The HMD 1010 includes no wheels 915, propellers 925, or other conveyance of its own. Instead, the HMD 1010 relies on the movements of the user 1020 to move the HMD 1010 about the environment. Thus, in some cases, the HMD 1010, when performing a SLAM technique, can skip path planning using a path planning engine and/or movement actuation using the movement actuator. In some cases, the HMD 1010 can still perform path planning using a path planning engine, and can indicate directions to follow a suggested path to the user 1020 to direct the user along the suggested path planned using the path planning engine. In some cases, for instance where the HMD 1010 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels 915, propellers 925, legs, or any other form of conveyance. If the environment is a virtual environment, then the HMD 1010 can still perform path planning using the path planning engine and/or movement actuation. If the environment is a virtual environment, the HMD 1010 can perform movement actuation using the movement actuator by performing a virtual movement within the virtual environment. Even if an environment is virtual, SLAM techniques may still be valuable, as the virtual environment can be unmapped and/or may have been generated by a device other than the HMD 1010, such as a remote server or console associated with a video game or video game platform. In some cases, feature tracking and/or SLAM may be performed in a virtual environment even by vehicle or other device that has its own physical conveyance system that allows it to physically move about a physical environment. For example, SLAM may be performed in a virtual environment to test whether (e.g., a SLAM system 300, SLAM system 510, SLAM system 555) is working properly without wasting time or energy on movement and without wearing out a physical conveyance system.

Figure 11A:
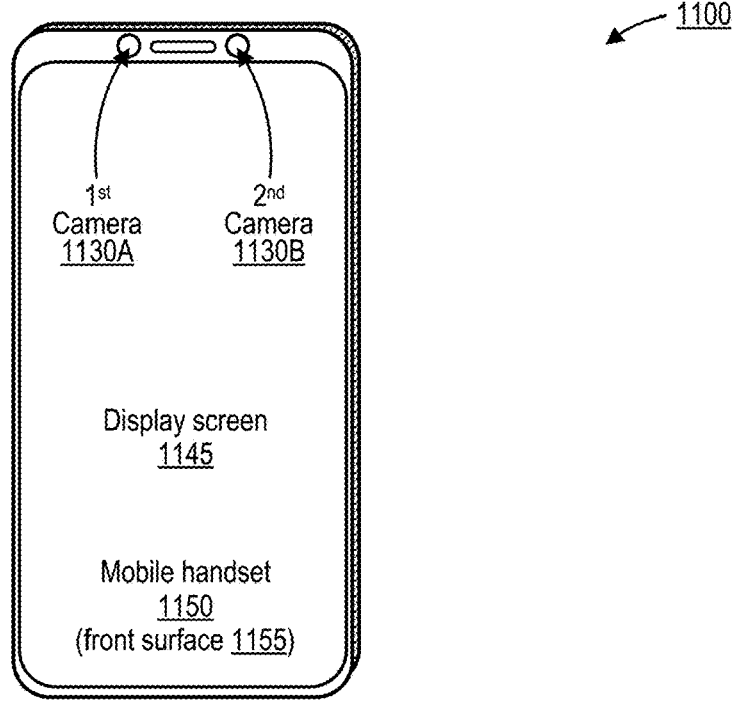
FIG. 11A is a perspective diagram illustrating a front surface of a mobile handset that performs feature tracking and/or VSLAM using one or more front-facing cameras, in accordance with some examples.

FIG. 11A is a perspective diagram 1100 illustrating a front surface 1155 of a mobile device 1150 that performs feature tracking and/or visual simultaneous localization and mapping (VSLAM) using one or more front-facing cameras 1130A-1130B, in accordance with some examples. The mobile device 1150 may be an example of a XR system 200, a SLAM system 300, a device 400, a mobile device 550, or a combination thereof. The mobile device 1150 may be, for example, a cellular telephone, a satellite phone, a portable gaming console, a music player, a health tracking device, a wearable device, a wireless communication device, a laptop, a mobile device, any other type of computing device or computing system 1300 discussed herein, or a combination thereof. The front surface 1155 of the mobile device 1150 includes a display screen 1145. The front surface 1155 of the mobile device 1150 includes a first camera 1130A and a second camera 1130B. The first camera 1130A and the second camera 1130B are illustrated in a bezel around the display screen 1145 on the front surface 1155 of the mobile device 1150. In some examples, the first camera 1130A and the second camera 1130B can be positioned in a notch or cutout that is cut out from the display screen 1145 on the front surface 1155 of the mobile device 1150. In some examples, the first camera 1130A and the second camera 1130B can be under-display cameras that are positioned between the display screen 1145 and the rest of the mobile device 1150, so that light passes through a portion of the display screen 1145 before reaching the first camera 1130A and the second camera 1130B. The first camera 1130A and the second camera 1130B of the perspective diagram 1100 are front-facing cameras. The first camera 1130A and the second camera 1130B face a direction perpendicular to a planar surface of the front surface 1155 of the mobile device 1150. The first camera 1130A and the second camera 1130B may be two of the one or more cameras 310. In some examples, the front surface 1155 of the mobile device 1150 may only have a single camera. In some examples, the mobile device 1150 may include one or more additional cameras in addition to the first camera 1130A and the second camera 1130B. In some examples, the mobile device 1150 may include one or more additional sensors in addition to the first camera 1130A and the second camera 1130B.

Figure 11B:
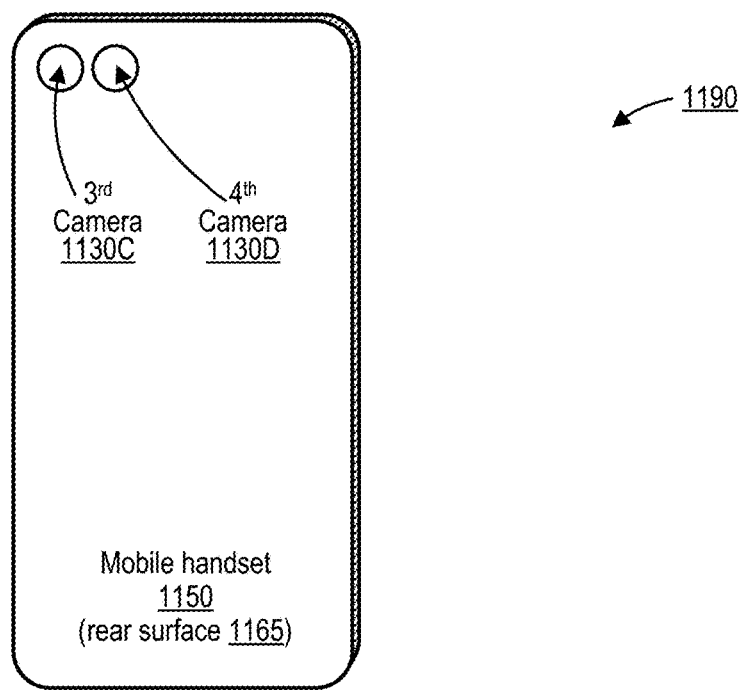
FIG. 11B is a perspective diagram illustrating a rear surface of a mobile handset that performs feature tracking and/or VSLAM using one or more rear-facing cameras, in accordance with some examples.

FIG. 11B is a perspective diagram 1190 illustrating a rear surface 1165 of a mobile device 1150 that performs feature tracking and/or visual simultaneous localization and mapping (VSLAM) using one or more rear-facing cameras 1130C-D, in accordance with some examples. The mobile device 1150 includes a third camera 1130C and a fourth camera 1130D on the rear surface 1165 of the mobile device 1150. The third camera 1130C and the fourth camera 1130D of the perspective diagram 1190 are rear-facing. The third camera 1130C and the fourth camera 1130D face a direction perpendicular to a planar surface of the rear surface 1165 of the mobile device 1150. While the rear surface 1165 of the mobile device 1150 does not have a display screen 1145 as illustrated in the perspective diagram 1190, in some examples, the rear surface 1165 of the mobile device 1150 may have a second display screen. If the rear surface 1165 of the mobile device 1150 has a display screen 1145, any positioning of the third camera 1130C and the fourth camera 1130D relative to the display screen 1145 may be used as discussed with respect to the first camera 1130A and the second camera 1130B at the front surface 1155 of the mobile device 1150. The third camera 1130C and the fourth camera 1130D may be two of the one or more cameras 310. In some examples, the rear surface 1165 of the mobile device 1150 may only have a single camera. In some examples, the mobile device 1150 may include one or more additional cameras in addition to the first camera 1130A, the second camera 1130B, the third camera 1130C, and the fourth camera 1130D. In some examples, the mobile device 1150 may include one or more additional sensors in addition to the first camera 1130A, the second camera 1130B, the third camera 1130C, and the fourth camera 1130D.

Like the HMD 1010, the mobile device 1150 includes no wheels 915, propellers 925, or other conveyance of its own. Instead, the mobile device 1150 relies on the movements of a user holding or wearing the mobile device 1150 to move the mobile device 1150 about the environment. Thus, in some cases, the mobile device 1150, when performing a SLAM technique, can skip path planning using the path planning engine and/or movement actuation using the movement actuator. In some cases, the mobile device 1150 can still perform path planning using the path planning engine, and can indicate directions to follow a suggested path to the user to direct the user along the suggested path planned using the path planning engine. In some cases, for instance where the mobile device 1150 is used for AR, VR, MR, or XR, the environment may be entirely or partially virtual. In some cases, the mobile device 1150 may be slotted into a head-mounted device (HMD) (e.g., into a cradle of the HMD) so that the mobile device 1150 functions as a display of the HMD, with the display screen 1145 of the mobile device 1150 functioning as the display of the HMD. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 1150. The movement actuator may include any such input device. Movement through the virtual environment may not require wheels 915, propellers 925, legs, or any other form of conveyance. If the environment is a virtual environment, then the mobile device 1150 can still perform path planning using the path planning engine and/or movement actuation. If the environment is a virtual environment, the mobile device 1150 can perform movement actuation using the movement actuator by performing a virtual movement within the virtual environment.

Figure 12:
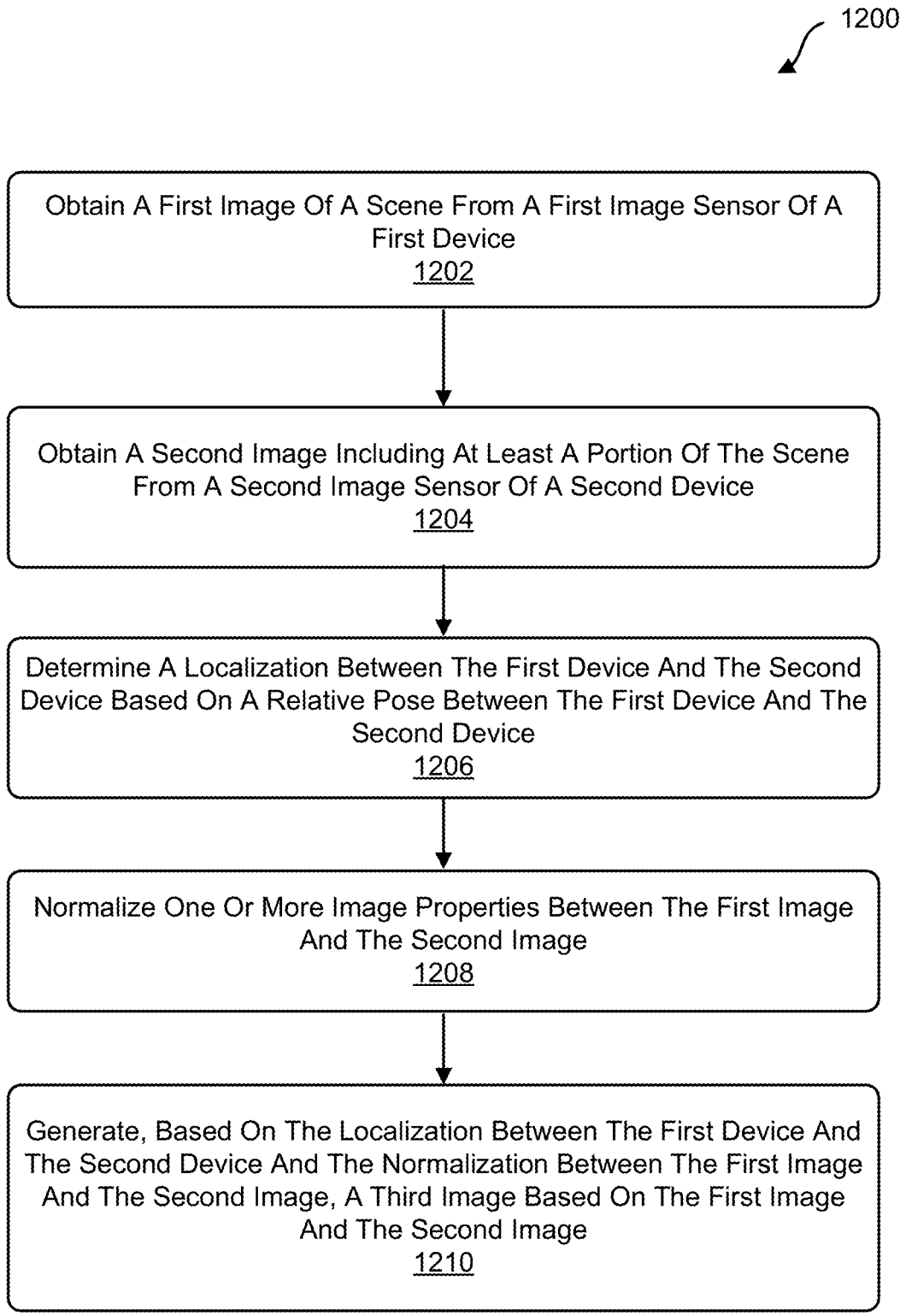
FIG. 12 is a flow diagram illustrating an example of an image processing technique, in accordance with some examples.

FIG. 12 is a flow diagram illustrating an example of a process 1200 implementing an image processing technique, in accordance with some examples. At block 1202, the process 1200 includes obtaining a first image of a scene from a first image sensor of a first device (e.g., mobile device 550, HMD 505 of FIG. 5).

At block 1204, the process 1200 includes obtaining a second image including at least a portion of the scene from a second image sensor of a second device (e.g., HMD 505, mobile device 550 of FIG. 5). In some aspects, the second image is transmitted over a communications link between the first device and the second device. In some implementations, the communications link is a wireless communications link.

At block 1206, the process 1200 includes determine a localization e.g., by SLAM system 510, mobile device tracking engine 515, SLAM system 555 of FIG. 5) between the first device and the second device based on a relative pose between the first device and the second device. In some examples, the localization includes at least one or more of SLAM maps, sensor measurements, inertial sensor measurements, images, or feature vectors.

At block 1208, the process 1200 includes normalizing (e.g., by image normalization engine 606 of FIG. 6) one or more image properties between the first image and the second image. In some cases, normalizing the one or more image properties between the first image and the second image includes adjusting first one or more image properties of the first image or second one or more image properties of the second image to produce the third image having either the first one or more image properties or the second one or more image properties. In some cases, the one or more image properties includes at least one or more of resolution, brightness, white balance, color balance, focus, depth of field, field of view, or distortion.

At block 1210, the process 1200 includes generating (e.g., by fusion engine 608 of FIG. 6), based on the localization between the first device and the second device and the normalization between the first image and the second image, a third image based on the first image and the second image. In some cases, the second image depicts at least a portion of the first device; and the process 1200 includes removing the at least a portion of the first device from the second image. In some aspects, determining the localization between the first device and the second device includes detecting one or more features associated with the first device in the second image. In some cases, the at least a portion of the first device is not depicted in the first image. In some examples, generating the third image includes removing an object from the second image. In some aspects, the object is absent from the first image. In some implementations, generating the third image includes generating an intermediate image based on the second image. In some aspects, generating the intermediate image includes at least partially removing the object from the second image. In some cases, the process 1200 includes generating the third image based on the first image and the intermediate image. In some examples, generating the intermediate image includes detecting one or more features associated with the object in the second image and generating a segmentation associated with the object based on the one or more features. In some cases, generating the intermediate image further includes inpainting pixels of the intermediate image corresponding to the object after the object is at least partially removed. In some examples, the object includes at least one or more of a human body part, an electronic device, or a mechanical structure.

In some aspects, the process 1200 includes obtaining a fourth image of a second scene from the first image sensor and obtaining a fifth image of the second scene from the second image sensor. In some aspects, the fourth image is transmitted over a communications link (e.g., communications link 530 of FIG. 5) between the first device and the second device. In some implementations, process 1200 includes determining an additional localization between the first device and the second device. In some cases, the additional localization is based on an additional relative pose between the first device and the second device and the additional relative pose is different from the relative pose (e.g., when the first device and the second device are non-rigidly attached). In some cases, the process 1200 includes normalizing one or more image properties between the fourth image and the fifth image and generating, based on the additional localization between the first device and the second device and normalizing the one or more image properties between the fourth image and the fifth image, a sixth image based on the fourth image and the fifth image.

In some implementations, the first image includes a first perspective (e.g., a first viewpoint) of the scene and the second image comprises a second perspective of the scene (e.g., a second viewpoint), different from the first perspective of the scene and generating the combined image includes adjusting pixels of the second image to the first perspective or adjusting pixels of the first image to the second perspective.

In some examples, the first device includes a first housing and the second device includes a second housing. In some cases, the first device and the second device are configured such that the relative pose between the first device and the second device can be changed.

In some aspects, the process 1200 includes determining a misalignment between the first image of the scene and the second image of the scene; and based on the misalignment, generating an indicator (e.g., indicator 810 of FIG. 8A) for indicating an adjustment between the first image sensor and the second image sensor to correct the misalignment.

The process 1200 illustrated in FIG. 12 may also include any operation discussed illustrated in, or discussed with respect to, the image capture and processing system 100, the image capture device 105A, the image processing device 105B, the XR system, the SLAM system 300, or a combination thereof. The image processing technique of FIG. 12 may represent at least some of the operations of an image capture and processing system 100, an image capture device 105A, an image processing device 105B, an XR system 200, a SLAM system 300, an unmanned ground vehicle (UGV) 910, an unmanned aerial vehicle (UAV) 920, a head-mounted display (HMD) 1010, a mobile device 1150, a computing system 1300, or a combination thereof.

In some cases, at least a subset of the techniques illustrated by the process 1200 may be performed remotely by one or more network servers of a cloud service. In some examples, the processes described herein (e.g., process 1200 and/or other process(es) described herein) may be performed by a computing device or apparatus. In some examples, the process 1200 can be performed by the image capture device 105A of FIG. 1. In some examples, the process 1200 can be performed by the image processing device 105B of FIG. 1. The process 1200 can also be performed by the image capture and processing system 100 of FIG. 1. The process 1200 can also be performed by the XR device of FIG. 2, the SLAM system 300 of FIG. 3, the aperture fusion system 500 of FIG. 5, the aperture fusion engine 600 of FIG. 6, the unmanned ground vehicle (UGV) 910 of FIG. 9A, the unmanned aerial vehicle (UAV) 920 of FIG. 9B, the head-mounted display (HMD) 1010 of FIGS. 10A-10B, the mobile device 1150 of FIGS. 11A-11B, a variation thereof, or a combination thereof.

The process 1200 can also be performed by a computing device with the architecture of the computing system 1300 shown in FIG. 13. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1200. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by block diagrams in FIG. 1 (of image capture and processing system 100), FIG. 2 (of XR system 200), FIG. 3 (of SLAM system 300), and FIG. 13 (of system 1300) and the flow diagram illustrating process 1200 are illustrative of, or organized as, logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by block diagrams 100, 200, 300, 500, 600, and 1300 and the flow diagram illustrating process 1200 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 13 is a diagram illustrating an example of a system for implementing certain aspects of the present technology. In particular, FIG. 13 illustrates an example of computing system 1300, which can be for example any computing device making up the image capture and processing system 100, the image capture device 105A, the image processing device 105B, the XR system, the SLAM system 300, the aperture fusion system 500, the aperture fusion engine 600, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some aspects, computing system 1300 is a distributed system in which the functions described in this disclosure can be distributed within a datacenter, multiple data centers, a peer network, etc. In some cases, one or more of the described system components represents many such components each performing some or all of the function for which the component is described. In some cases, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1002.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some aspects, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative Aspects of the Disclosure Include:

Aspect 1 An apparatus for generating images based on two or more images, comprising: a first device comprising: a first image sensor; a memory; and one or more processors coupled to the memory and configured to: obtain a first image of a scene from the first image sensor; obtain a second image of the scene from a second image sensor of a second device, wherein the second image is transmitted over a communications link between the first device and the second device; determine a localization between the first device and the second device based on a relative pose between the first device and the second device; normalize one or more image properties between the first image and the second image; and generate, based on the localization between the first device and the second device and normalizing the one or more image properties between the first image and the second image, a third image based on the first image and the second image.

Aspect 2 The apparatus of Aspect 1, wherein: the first device comprises a first housing; the second device comprises second housing, different from the first housing; and the first device and the second device are configured such that the relative pose between the first device and the second device can be changed.

Aspect 3 The apparatus of any of Aspects 1 to 2, wherein the first device comprises a mobile device and the second device comprises a head mounted display.

Aspect 4 The apparatus of any of Aspects 1 to 3, wherein the second image depicts at least a portion of the first device; and wherein, to generate the third image, the one or more processors are configured to remove the at least a portion of the first device from the second image.

Aspect 5 The apparatus of any of Aspects 1 to 4, wherein, to determine the localization between the first device and the second device, the one or more processors are configured to detect one or more features associated with the first device in the second image, wherein the at least a portion of the first device is not depicted in the first image.

Aspect 6 The apparatus of any of Aspects 1 to 5, the one or more processors configured to: obtain a fourth image of a second scene from the first image sensor; obtain a fifth image of the second scene from the second image sensor, wherein the fifth image is transmitted over the communications link between the first device and the second device; determine an additional localization between the first device and the second device, wherein the additional localization is based on an additional relative pose between the first device and the second device, wherein the additional relative pose is different from the relative pose; normalize one or more image properties between the fourth image and the fifth image; and generate, based on the additional localization between the first device and the second device and normalizing the one or more image properties between the fourth image and the fifth image, a sixth image based on the fourth image and the fifth image.

Aspect 7 The apparatus of any of Aspects 1 to 6, wherein the communications link is a wireless communications link.

Aspect 8 The apparatus of any of Aspects 1 to 7, wherein, to normalize the one or more image properties between the first image and the second image, the one or more processors are configured to adjust first one or more image properties of the first image or second one or more image properties of the second image to produce the third image having either the first one or more image properties or the second one or more image properties.

Aspect 9 The apparatus of any of Aspects 1 to 8, wherein the one or more image properties comprises at least one or more of resolution, brightness, white balance, color balance, focus, depth of field, field of view, or distortion.

Aspect 10 The apparatus of any of Aspects 1 to 9, the one or more processors configured to: obtain an input associated with a change in zoom; obtain a fourth image of the scene from the first image sensor; obtain a fifth image including at least a portion of the scene from the second image sensor; determine an additional localization between the first device and the second device based on an additional relative pose between the first device and the second device; normalize one or more image properties between the fourth image and the fifth image; and generate, based on the localization between the first device and the second device, the input associated with the change in zoom, and normalizing the one or more image properties between the fourth image and the fifth image, a sixth image based on the fourth image and the fifth image.

Aspect 11 The apparatus of any of Aspects 1 to 10, wherein a first field of view (FOV) associated with the third image is different from a second FOV associated with the sixth image.

Aspect 12 The apparatus of any of Aspects 1 to 11, wherein the localization comprises at least one or more of SLAM maps, sensor measurements, inertial sensor measurements, images, or feature vectors.

Aspect 13 The apparatus of any of Aspects 1 to 12, the one or more processors configured to: determine a misalignment between the first image of the scene and the second image of the scene; and based on the misalignment, generate an indicator for indicating an adjustment between the first image sensor and the second image sensor to correct the misalignment.

Aspect 14 The apparatus of any of Aspects 1 to 13, wherein the first image comprises a first field of view (FOV) and the second image comprises a second FOV, different from the first FOV.

Aspect 15 The apparatus of any of Aspects 1 to 14, wherein, to determine the misalignment between the first image of the scene and the second image of the scene, the one or more processors are configured to determine an amount of overlap between the first FOV and the second FOV.

Aspect 16 The apparatus of any of Aspects 1 to 15, to generate the indicator, the one or more processors are configured to generate, based on determining that the misalignment exceeds a misalignment threshold, the indicator for indicating the adjustment.

Aspect 17 The apparatus of any of Aspects 1 to 16, wherein, to determine that the misalignment exceeds the misalignment threshold, the one or more processors are configured to determine an amount of overlap between the first FOV and the second FOV.

Aspect 18 The apparatus of any of Aspects 1 to 17, where determining that the misalignment exceeds the misalignment threshold comprises determining that the amount of overlap between the first FOV and the second FOV is below an FOV overlap threshold.

Aspect 19 The apparatus of any of Aspects 1 to 18, wherein the indication of the adjustment comprises an indication of at least one or more of shifting, rotating, or moving at least one or more of the first device or the second device.

Aspect 20 The apparatus of any of Aspects 1 to 19, the one or more processors configured to: display the indicator on at least one or more of a display of the first device or a display of the second device.

Aspect 21 The apparatus of any of Aspects 1 to 20, wherein the indicator provides an indication of an adjustment for adjusting the first device to align the first FOV with the second FOV.

Aspect 22 The apparatus of any of Aspects 1 to 21, wherein indicator is displayed on the display of the first device.

Aspect 23 The apparatus of any of Aspects 1 to 22, wherein indicator provides an indication of an adjustment for adjusting the second device to align the second FOV with the first FOV.

Aspect 24 The apparatus of any of Aspects 1 to 23, wherein the indicator is displayed on the display of the second device.

Aspect 25 The apparatus of any of Aspects 1 to 24, wherein: the first image sensor is associated with a first optical axis; and the second image sensor is associated with a second optical axis, wherein the first optical axis and the second optical axis intersect.

Aspect 26 The apparatus of any of Aspects 1 to 25, wherein, to generate the third image, the one or more processors are configured to remove an object from the second image, wherein the object is absent from the first image.

Aspect 27 The apparatus of any of Aspects 1 to 26, wherein, to generate the third image, the one or more processors are configured to: generate an intermediate image based on the second image, wherein generating the intermediate image comprises at least partially removing the object from the second image; and generate the third image based on the first image and the intermediate image.

Aspect 28 The apparatus of any of Aspects 1 to 27, wherein, to generate the intermediate image, the one or more processors are configured to detect one or more features associated with the object in the second image and generate a segmentation associated with the object based on the one or more features.

Aspect 29 A method for generating a combined image based on two or more images, comprising: obtaining a first image of a scene from a first image sensor of a first device; obtaining a second image including at least a portion of the scene from a second image sensor of a second device, wherein the second image is transmitted over a communications link between the first device and the second device; determining a localization between the first device and the second device based on a relative pose between the first device and the second device; normalizing one or more image properties between the first image and the second image; and generating, based on the localization between the first device and the second device and normalizing the one or more image properties between the first image and the second image, a third image based on the first image and the second image.

Aspect 30 The method of Aspect 29, wherein the first device comprises a first housing; the second device comprises second housing, different from the first housing; and the first device and the second device are configured such that the relative pose between the first device and the second device can be changed.

Aspect 31 The method of any of Aspects 29 to 30, wherein the first device comprises a mobile device and the second device comprises a head mounted display.

Aspect 32 The method of any of Aspects 29 to 31, wherein the second image depicts at least a portion of and wherein generating the third image comprises removing the at least a portion of the first device from the second image.

Aspect 33 The method of any of Aspects 29 to 32, further comprising detecting one or more features associated with the first device in the second image, wherein the first device is absent from the first image.

Aspect 34 The method of any of Aspects 29 to 33, wherein: the second image depicts at least one or more of a human body part, an electronic device, or a mechanical structure; and generating the third image comprises removing the at least one or more of the human body part, the electronic device, or the mechanical structure from the second image.

Aspect 35 The method of any of Aspects 29 to 34, further comprising: obtaining a fourth image of a second scene from the first image sensor; obtaining a fifth image of the second scene from the second image sensor, wherein the fourth image is transmitted over the communications link between the first device and the second device; determining an additional localization between the first device and the second device, wherein the additional localization is based on an additional relative pose between the first device and the second device, wherein the additional relative pose is different from the relative pose; normalizing one or more image properties between the fourth image and the fifth image; and generating, based on the additional localization between the first device and the second device and normalizing the one or more image properties between the fourth image and the fifth image, a sixth image based on the fourth image and the fifth image.

Aspect 36 The method of any of Aspects 29 to 35, wherein a FOV associated with the third image is different from a FOV associated with the sixth image.

Aspect 37 The method of any of Aspects 29 to 36, wherein the communications link is a wireless communications link.

Aspect 38 The method of any of Aspects 29 to 37, wherein normalizing the one or more image properties between the first image and the second image comprises adjusting first one or more image properties of the first image or second one or more image properties of the second image to produce the third image having either the first one or more image properties or the second one or more image properties.

Aspect 39 The method of any of Aspects 29 to 38, wherein the one or more image properties comprises at least one or more of resolution, brightness, white balance, color balance, focus, depth of field, field of view, or distortion.

Aspect 40 The method of any of Aspects 29 to 39, wherein: the first image comprises a first perspective of the scene and the second image comprises a second perspective of the scene, different from the first perspective of the scene; and generating the combined image comprises adjusting pixels of the second image to the first perspective or adjusting pixels of the first image to the second perspective.

Aspect 41 The method of any of Aspects 29 to 40, wherein the second device is ahead-mounted display and the first device is a mobile device.

Aspect 42 The method of any of Aspects 29 to 41, wherein the localization comprises at least one or more of SLAM maps, sensor measurements, inertial sensor measurements, images, or feature vectors.

Aspect 43 The method of any of Aspects 29 to 42, further comprising: determining a misalignment between the first image of the scene and the second image of the scene; and based on the misalignment, generating an indicator for indicating an adjustment between the first image sensor and the second image sensor to correct the misalignment.

Aspect 44 The method of any of Aspects 29 to 43, wherein the first image comprises a first FOV and the second image comprises a second FOV, different from the first FOV.

Aspect 45 The method of any of Aspects 29 to 44, wherein generating the indicator comprises generating, based on determining that the misalignment exceeds a misalignment threshold, the indicator for indicating the adjustment.

Aspect 46 The method of any of Aspects 29 to 45, wherein determining that the misalignment exceeds the misalignment threshold comprises determining an amount of overlap between the first FOV and the second FOV.

Aspect 47 The method of any of Aspects 29 to 46, wherein determining that the misalignment exceeds the misalignment threshold comprises determining an amount of overlap between the first FOV and the second FOV.

Aspect 48 The method of any of Aspects 29 to 47, wherein determining that the misalignment exceeds the misalignment threshold comprises determining that the amount of overlap between the first FOV and the second FOV is below an FOV overlap threshold.

Aspect 49 The method of any of Aspects 29 to 48, further comprising displaying the indicator on at least one or more of a display of the first device or a display of the second device.

Aspect 50 The method of any of Aspects 29 to 49, wherein the indicator provides an indication of an adjustment for adjusting the first device to align the first FOV with the second FOV.

Aspect 51 The method of any of Aspects 29 to 50, wherein the indicator is displayed on the display of the first device.

Aspect 52 The method of any of Aspects 29 to 51, wherein the indicator provides an indication of an adjustment for adjusting the second device to align the second FOV with the first FOV.

Aspect 53 The method of any of Aspects 29 to 52, wherein the indicator is displayed on the display of the second device.

Aspect 54 The method of any of Aspects 29 to 53, wherein the indication of the adjustment comprises an indication of at least one or more of shifting, rotating, or moving at least one or more of the first device or the second device.

Aspect 55 The method of any of Aspects 29 to 54, wherein: the first image sensor is associated with a first optical axis; and the second image sensor is associated with a second optical axis, wherein the first optical axis and the second optical axis intersect.

Aspect 56 The method of any of Aspects 29 to 55, wherein generating the third image comprises removing an object from the second image, wherein the object is absent from the first image.

Aspect 57 The method of any of Aspects 29 to 56, wherein: generating the third image comprises generating an intermediate image based on the second image, wherein generating the intermediate image comprises at least partially removing the object from the second image; and generating the third image based on the first image and the intermediate image.

Aspect 58 The method of any of Aspects 29 to 57, wherein generating the intermediate image comprises detecting one or more features associated with the object in the second image and generating a segmentation associated with the object based on the one or more features.

Aspect 59: A non-transitory computer-readable storage medium having stored thereon instructions which, when executed by one or more processors, cause the one or more processors to perform any of the operations of aspects 1 to 58.

Aspect 60: An apparatus comprising means for performing any of the operations of aspects 1 to 58.

What is claimed is:

1. An apparatus for generating images based on two or more images, comprising:
a first device comprising:
a first image sensor;
a memory; and
one or more processors coupled to the memory and configured to:
obtain a first image of a scene from the first image sensor;
obtain a second image of the scene from a second image sensor of a second device, wherein the second image is transmitted over a communications link between the first device and the second device;
determine a localization between the first device and the second device based on a relative pose between the first device and the second device;
normalize one or more image properties between the first image and the second image; and
generate, based on the localization between the first device and the second device, an indicator for indicating an alignment adjustment between the first image sensor and the second image sensor.

2. The apparatus of claim 1, wherein:
the first device comprises a first housing;
the second device comprises second housing, different from the first housing; and
the first device and the second device are configured such that the relative pose between the first device and the second device can be changed.

3. The apparatus of claim 1, wherein the first device comprises a mobile device and the second device comprises a head mounted display.

4. The apparatus of claim 1, the one or more processors configured to generate, based on the localization between the first device and the second device and normalizing the one or more image properties between the first image and the second image, a third image based on the first image and the second image.

5. The apparatus of claim 4, wherein the second image depicts at least a portion of the first device; and wherein, to generate the third image, the one or more processors are configured to remove at least the portion of the first device from the second image.

6. The apparatus of claim 5, wherein, to determine the localization between the first device and the second device, the one or more processors are configured to detect one or more features associated with the first device in the second image, wherein at least the portion of the first device is not depicted in the first image.

7. The apparatus of claim 1, the one or more processors configured to:
obtain a fourth image of a second scene from the first image sensor;
obtain a fifth image of the second scene from the second image sensor, wherein the fifth image is transmitted over the communications link between the first device and the second device;
determine an additional localization between the first device and the second device, wherein the additional localization is based on an additional relative pose between the first device and the second device, wherein the additional relative pose is different from the relative pose;
normalize one or more image properties between the fourth image and the fifth image; and
generate, based on the additional localization between the first device and the second device and normalizing the one or more image properties between the fourth image and the fifth image, a sixth image based on the fourth image and the fifth image.

8. The apparatus of claim 1, wherein the communications link is a wireless communications link.

9. The apparatus of claim 4, wherein, to normalize the one or more image properties between the first image and the second image, the one or more processors are configured to adjust first one or more image properties of the first image or second one or more image properties of the second image to produce the third image having either the first one or more image properties or the second one or more image properties.

10. The apparatus of claim 4, wherein the one or more image properties comprises at least one or more of resolution, brightness, white balance, color balance, focus, depth of field, field of view, or distortion;
wherein, to generate the third image, the one or more processors are configured to remove an object from the second image, wherein the object is absent from the first image.

11. The apparatus of claim 4, the one or more processors configured to:
obtain an input associated with a change in zoom;
obtain a fourth image of the scene from the first image sensor;
obtain a fifth image including at least a portion of the scene from the second image sensor;
determine an additional localization between the first device and the second device based on an additional relative pose between the first device and the second device;
normalize one or more image properties between the fourth image and the fifth image; and
generate, based on the localization between the first device and the second device, the input associated with the change in zoom, and normalizing the one or more image properties between the fourth image and the fifth image, a sixth image based on the fourth image and the fifth image.

12. The apparatus of claim 11, wherein a first field of view associated with the third image is different from a second field of view associated with the sixth image.

13. The apparatus of claim 1, wherein the localization comprises at least one or more of SLAM maps, sensor measurements, inertial sensor measurements, images, or feature vectors.

14. The apparatus of claim 1, wherein the first image comprises a first field of view (FOV) and the second image comprises a second FOV, different from the first FOV.

15. The apparatus of claim 14, wherein, to generate the indicator for indicating the alignment adjustment between the first image sensor and the second image sensor, the one or more processors are configured to determine an amount of overlap between the first FOV and the second FOV.

16. A method for generating a combined image based on two or more images, comprising:
obtaining a first image of a scene from a first image sensor of a first device;

obtaining a second image including at least a portion of the scene from a second image sensor of a second device, wherein the second image is transmitted over a communications link between the first device and the second device;

determining a localization between the first device and the second device based on a relative pose between the first device and the second device;

normalizing one or more image properties between the first image and the second image; and generating, based on the localization between the first device and the second device, an indicator for indicating an alignment adjustment between the first image sensor and the second image sensor.

17. The method of claim 16, wherein the first device comprises a first housing;

the second device comprises second housing, different from the first housing; and the first device and the second device are configured such that the relative pose between the first device and the second device can be changed.

18. The method of claim 16, wherein the first device comprises a mobile device and the second device comprises a head mounted display.

19. The method of claim 16, further comprising generating, based on the localization between the first device and the second device and normalizing the one or more image properties between the first image and the second image, a third image based on the first image and the second image.

20. The method of claim 19, wherein the second image depicts at least a portion of the first device, and wherein generating the third image comprises removing at least the portion of the first device from the second image.

21. The method of claim 20, further comprising detecting one or more features associated with the first device in the second image, wherein the first device is absent from the first image.

22. The method of claim 19, wherein:

the second image depicts least one or more of a human body part, an electronic device, or a mechanical structure; and generating the third image comprises removing the at least one or more of the human body part, the electronic device, or the mechanical structure from the second image.

23. The method of claim 19, further comprising:

obtaining a fourth image of a second scene from the first image sensor;

obtaining a fifth image of the second scene from the second image sensor, wherein the fourth image is transmitted over the communications link between the first device and the second device;

determining an additional localization between the first device and the second device, wherein the additional localization is based on an additional relative pose between the first device and the second device, wherein the additional relative pose is different from the relative pose;

normalizing one or more image properties between the fourth image and the fifth image; and generating, based on the additional localization between the first device and the second device and normalizing the one or more image properties between the fourth image and the fifth image, a sixth image based on the fourth image and the fifth image.

24. The method of claim 23, wherein a FOV associated with the third image is different from a FOV associated with the sixth image.

25. The method of claim 16, wherein the communications link is a wireless communications link.

26. The method of claim 19, wherein normalizing the one or more image properties between the first image and the second image comprises adjusting first one or more image properties of the first image or second one or more image properties of the second image to produce the third image having either the first one or more image properties or the second one or more image properties.

27. The method of claim 16, wherein the one or more image properties comprises at least one or more of resolution, brightness, white balance, color balance, focus, depth of field, FOV, or distortion.

28. The method of claim 16, wherein:

the first image comprises a first perspective of the scene and the second image comprises a second perspective of the scene, different from the first perspective of the scene; and generating the combined image comprises adjusting pixels of the second image to the first perspective or adjusting pixels of the first image to the second perspective.

29. The method of claim 16, wherein the second device is a head-mounted display and the first device is a mobile device.

30. The method of claim 16, wherein the localization comprises at least one or more of SLAM maps, sensor measurements, inertial sensor measurements, images, or feature vectors.

* * * * *